US012808259B2

(12) United States Patent
Bodrozic

(10) Patent No.: US 12,808,259 B2
(45) Date of Patent: Nov. 24, 2026

(54) ELECTROMAGNETIC WAVEFRONT MODULATION APPARATUS

(71) Applicant: Vladimir Bodrozic, London (GB)

(72) Inventor: Vladimir Bodrozic, London (GB)

( * ) Notice: Subject to any disclaimer, the term of this patent is extended or adjusted under 35 U.S.C. 154(b) by 577 days.

(21) Appl. No.: 18/041,084

(22) PCT Filed: Aug. 11, 2021

(86) PCT No.: PCT/GB2021/052083
§ 371 (c)(1),
(2) Date: Feb. 9, 2023

(87) PCT Pub. No.: WO2022/034322
PCT Pub. Date: Feb. 17, 2022

(65) Prior Publication Data

US 2023/0417104 A1 Dec. 28, 2023

(30) Foreign Application Priority Data

Aug. 11, 2020 (GB) .................................... 2012493
Jan. 12, 2021 (GB) .................................... 2100397
(Continued)

(51) Int. Cl.
*E06B 9/264* (2006.01)
*E06B 9/24* (2006.01)

(52) U.S. Cl.
CPC ...... *E06B 9/264* (2013.01); *E06B 2009/2405* (2013.01); *E06B 2009/2464* (2013.01); *E06B 2009/2643* (2013.01)

(58) Field of Classification Search
None
See application file for complete search history.

(56) References Cited

U.S. PATENT DOCUMENTS 3,504,962 A * 4/1970 Shanley .................... E06B 9/24
359/593
4,458,977 A * 7/1984 Arns ........................ G03H 1/04
359/8

(Continued)

FOREIGN PATENT DOCUMENTS

GB 2546150 A 7/2017
JP 2016051133 A 4/2016

(Continued)

OTHER PUBLICATIONS

International Search Report, PCT Application No. PCT/GB2021/052083, 7 pages.

*Primary Examiner* — Ryan Crockett
(74) *Attorney, Agent, or Firm* — MH2 Technology Law Group LLP

(57) ABSTRACT

A light modification unit comprises two or more sheets including a first sheet having regions of high and low transmissivity and a second sheet having regions of high and low transmissivity. The second sheet is positioned substantially parallel to the first sheet and is translatable relative to it between a first position, in which high-transmissivity regions of the sheets overlap, and a second position, in which the overlap of the high-transmissivity regions is reduced. An optical coupling material may fill at least part of the space between the sheets, or in at least the first position the average separation between the sheets may be less than 400 nm to provide optical connection between them. The amount of light transmitted through the unit is varied by translation of the sheets, and the unit may form part of a glazing system or window assembly.

17 Claims, 16 Drawing Sheets

(30) Foreign Application Priority Data

Jan. 12, 2021 (GB) ..................................... 2100398
Jan. 14, 2021 (GB) ..................................... 2100493

(56) References Cited

U.S. PATENT DOCUMENTS

| | | | | |
|---|---|---|---|---|
| 4,970,381 | A * | 11/1990 | Huang | H04N 1/03 257/80 |
| 5,164,856 | A * | 11/1992 | Zhang | G02B 26/02 359/593 |
| 8,959,835 | B2 | 2/2015 | Drohan | |
| 2010/0243180 | A1 | 9/2010 | Hoberman et al. | |
| 2011/0259529 | A1 | 10/2011 | Clear | |
| 2012/0169950 | A1* | 7/2012 | Tatzel | G02F 1/133528 427/532 |
| 2013/0163062 | A1* | 6/2013 | Yang | E06B 9/24 359/228 |
| 2015/0071655 | A1 | 3/2015 | Tatzel et al. | |
| 2015/0121760 | A1* | 5/2015 | Drohan | E06B 7/30 49/86.1 |
| 2018/0321567 | A1* | 11/2018 | Orillard | C03C 17/225 |
| 2023/0093121 | A1* | 3/2023 | Abdulhalim | G02F 1/133504 349/16 |

FOREIGN PATENT DOCUMENTS

| | | | |
|---|---|---|---|
| WO | 9216868 | A1 | 10/1992 |
| WO | 2012105007 | A1 | 8/2012 |
| WO | 2018190282 | A1 | 10/2018 |

* cited by examiner

PRIOR ART

| N | Transmission (equation 2) |
|---|---|
| 1 | 0% |
| 2 | 42% |
| 3 | 52% |
| 4 | 54% |
| 5 | 53% |
| 6 | 51% |
| 7 | 48% |
| 8 | 46% |
| 9 | 43% |
| 10 | 40% |

| N | Transmission, with coupling (equation 4) |
|---|---|
| 1 | 0% |
| 2 | 50% |
| 3 | 67% |
| 4 | 75% |
| 5 | 80% |
| 6 | 83% |
| 7 | 86% |
| 8 | 88% |
| 9 | 89% |
| 10 | 90% |

| | | N | | | | | |
|---|---|---|---|---|---|---|---|
| | | 3 | 4 | 5 | 6 | 7 | 8 |
| r | 1 | 181% | 248% | 304% | 351% | 392% | 428% |
| | 2 | 129% | 142% | 150% | 156% | 159% | 162% |
| | 3 | 118% | 125% | 129% | 131% | 133% | 134% |
| | 5 | 110% | 114% | 115% | 117% | 118% | 118% |
| | 10 | 105% | 106% | 107% | 108% | 108% | 108% |
| | 20 | 102% | 103% | 103% | 104% | 104% | 104% |
| | 30 | 102% | 102% | 102% | 102% | 103% | 103% |

ELECTROMAGNETIC WAVEFRONT MODULATION APPARATUS

The present invention relates to light modification apparatus, particularly, but not exclusively, for modifying windows to allow alterable transparency.

Windows allow light to enter a building, and also allow the occupants to see outside. However, sometimes the occupants wish to reduce or stop the amount of light entering through the window, or reduce the ability of others to be able see in through the window.

Window blinds, shades, curtains, louvres, are well known, but are obtrusive. Another known type of solution is to provide a mechanical-movement based device which stop or reduce transmission of light through a specified region of space. This includes U.S. Pat. No. 3,444,919 which shows a series of screens having strips which form apertures, having one position where the strips and apertures of each screen are aligned and allow light to pass through, but may be translated to another position where the strips of each are each offset between screens, blocking the light. However, this solution is bulky and heavy and has a significant thickness, making it impractical for use with an existing window. The strips are also visually obtrusive. A similar device is shown in reference (2). Reference (3) shows a light shading device comprising sheets straddled in a loop moving along a window pane, however this solution too depends on bulky components such as support shafts and other fixing members.

Light reflection, transmission and scattering properties of a material can be changed on demand using electrochromic, thermochromic, gasochromic, photochromic, photoelectrochromic, and thermotropic effects as well as polymer dispersed liquid crystal (PDLC), suspension particle device (SPD), microelectromechanical, fluid control and other effects. For example, in electrochromic glazings an electrochemically active layer is sandwiched between two sheets of transparent electrodes and the transmittance is controlled by applying a voltage to the electrodes. These solutions are complex to fabricate, often require a power source, and are subject to failure. A review of some of these types of windows can be found in the invention section of reference (4).

Referring to FIGS. 1 and 2, known screens having several spaced moveable panels generally have a first position where the opaque areas are aligned and a maximum amount of light passes through, and a second position wherein the opaque areas are offset to completely cover the area of the screen and block all light. Providing more screens minimises the opaque area on each screen, minimising the light blocked by the opaque areas in the first position.

Referring to FIG. 3, where panels comprising regions 1 (containing optically transparent material) and regions 2 (containing optically opaque material) are shown, each interface of the material will reflect a proportion of light which meets the interface. Therefore, for N panels, the intensity of light $I_2$ that travels through these screens at a normal incidence (light ray orthogonal to said sheet plane) in the first position is given by the equation $$I_2 = I_0 \cdot [(1-R_{12}) \cdot (1-R_{21})]^N \cdot \left(1-\frac{1}{N}\right) \quad \text{(equation 1)}$$

where $I_0$ represents intensity of light ray impinging onto panel surface (again, at normal angle of incidence), $R_{12}$ is the reflection at the air/material interface (light entering into the material), $R_{21}$ is the reflection at the material/air interface (light exiting the material), and N is the number of optically active screens (meaning number of screens with the below described arrangement of opaque/transparent areas), for N screens each having 1/N of its area opaque. For brevity, this equation assumes that reflection is independent of wavelength and that there is no light scattering, absorption, or other type of loss. Taking $R_{12}=R_{21}$, equation (1) becomes $$I_2 = I_0 \cdot (1-R_{12})^{2N} \cdot \left(1-\frac{1}{N}\right) \quad \text{(equation 2)}$$

Referring to FIG. 4, $I_2$ is given for N sheets when $R_{12}$ is 4%, and $I_0$ is 1. It will be seen that the maximum transmission is given when 4 sheets are used, however this only allows a 54% transmission of light at normal incidence.

Additionally, if the panels are placed against a window (not shown in FIG. 3), reflections may also occur at window/air interfaces. If for the purposes of the discussion here $I_0$ is taken to equal $$I_0' \cdot (1-R_{01}), \text{ where } I_0'$$

is the intensity of light just before exiting the window material facing the screens at normal angle of incidence, and $R_{01}$ represents the reflection factor at the interface, then equation (2) becomes equation (3).

$$I_2 = I_0' \cdot (1-R_{01}) \cdot (1-R_{12})^{2N} \cdot \left(1-\frac{1}{N}\right) \quad \text{(equation 3)}$$

There are other types of devices, such as window glazings for vehicles or buildings, which act as a barrier for transfer of heat energy between such enclosed spaces and their surroundings. Often this involves a layer of heat-reflecting material being deposited on glass surface, but radiative heat reflecting capability of these coatings is limited, or is achieved at a significant cost to visible light transmission. Furthermore, for certain type of climates this approach has a drawback that it doesn't allow heat gain during winter. For many climate types, especially in those with large daily temperature variations, it's beneficial to have more flexibility and allow changing of heat reflection properties according to user demand, rather than having a constant profile throughout the day and year.

The objective of the present invention is to provide a device for modifying or attenuating electromagnetic waves, primarily in the 350-700 nm range (UV-visible) and 700-1400 nm (infra-red), and possibly other wavelength ranges.

According to the present invention, there is provided a light modification unit or a glazing unit system according to the independent claims.

The description of the apparatus, system and methods herein is not intended to limit the scope of the claims, but is merely representative of some of the possible embodiments of the invention. The following drawings and descriptions of embodiments are provided in order to illustrate key concepts rather than exact dimensions, shape or design details.

For a more detailed description of a number of terms used herein, such as "refractive index", "reflectivity", "sheet", etc, refer to the glossary section.

Figures 3, 4:
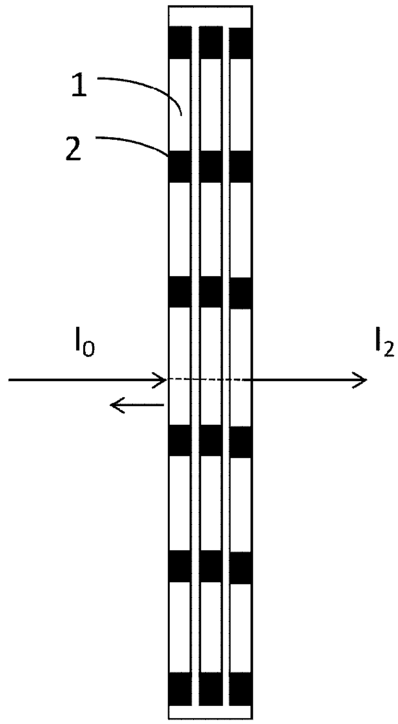
Figure 5A:
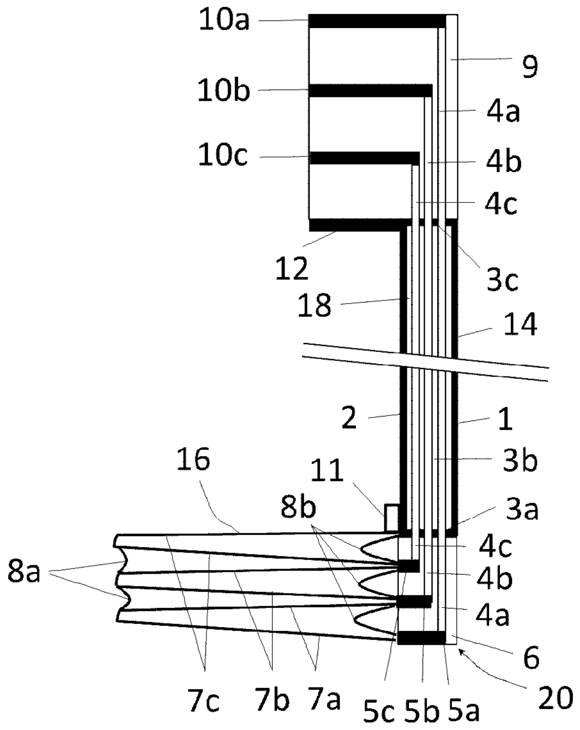
Figure 5B:
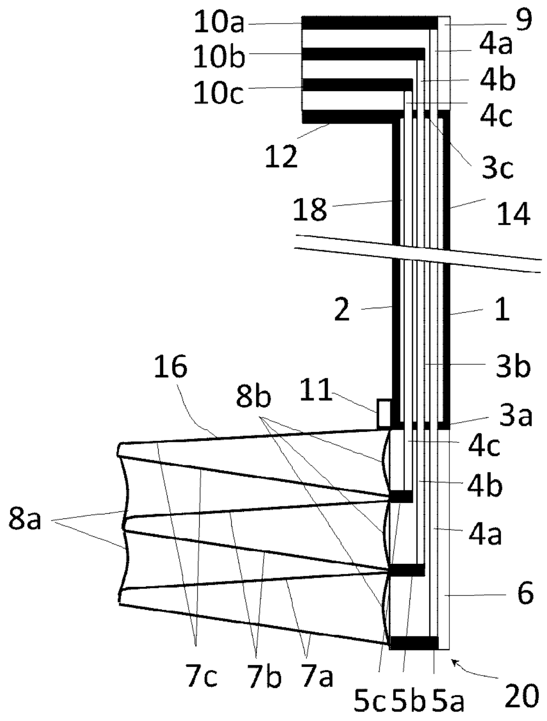
Figures 6, 7:
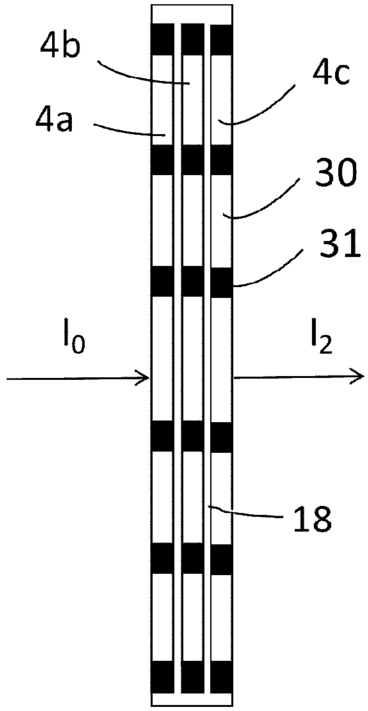
Figure 8A:
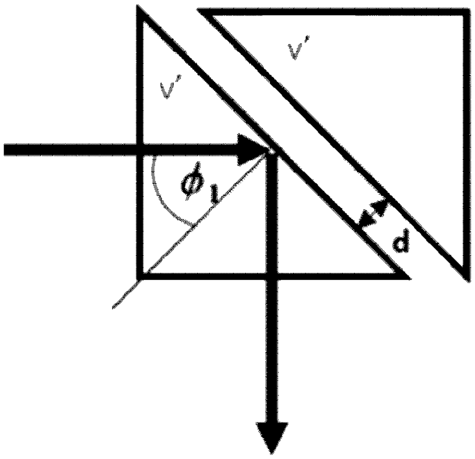
Figure 8B:
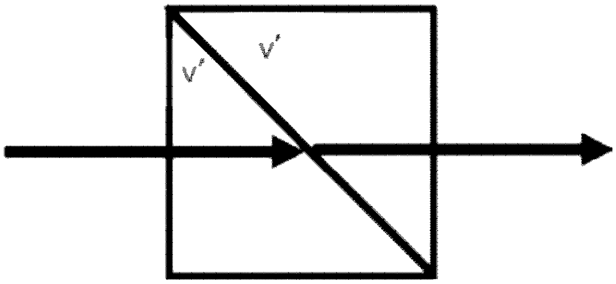
Figure 9:
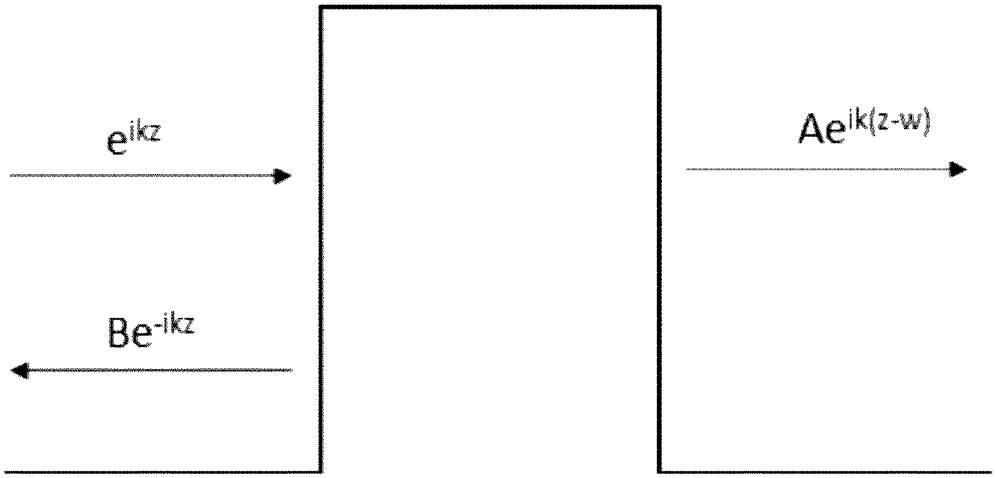
Figure 10:
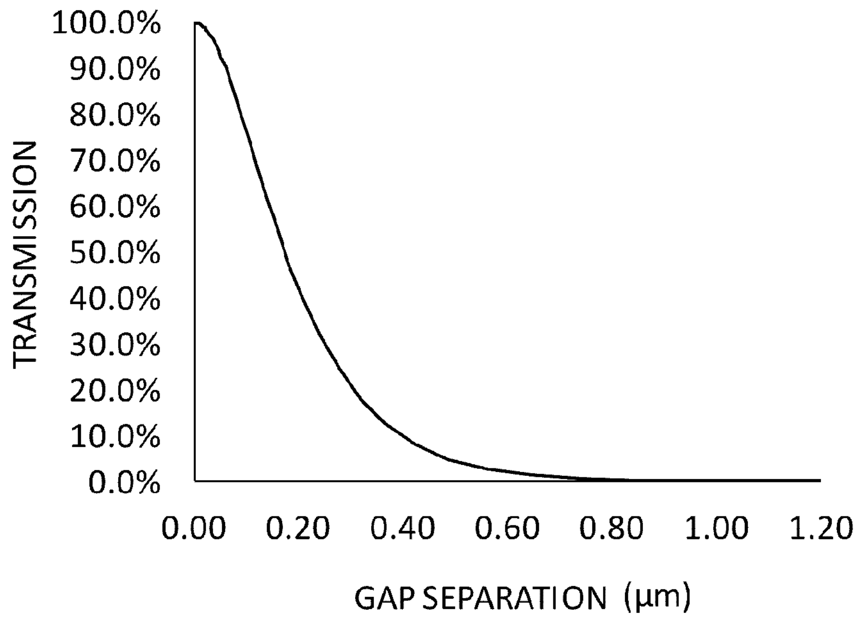
Figure 11:
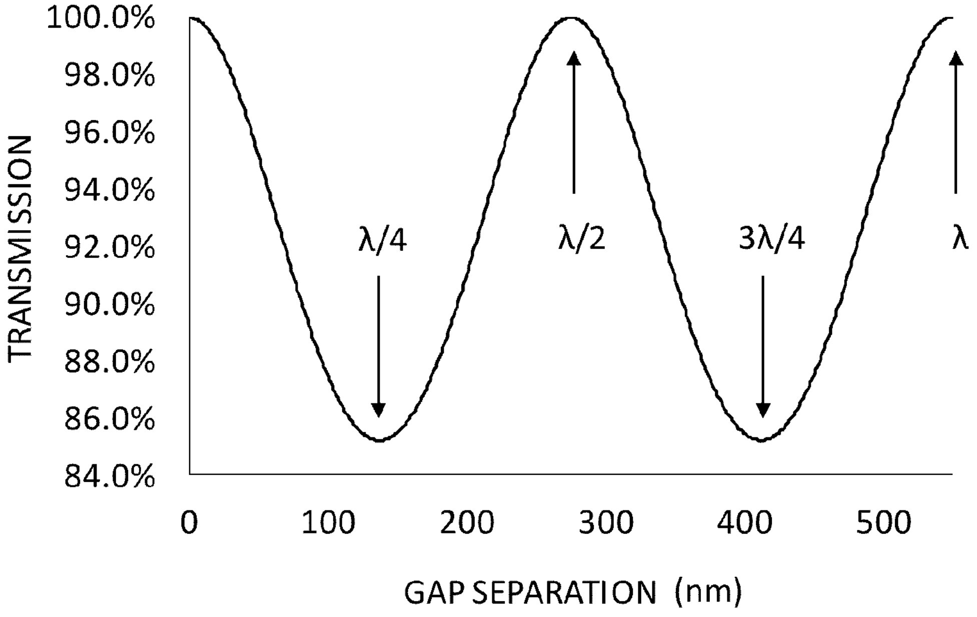
Figure 13:
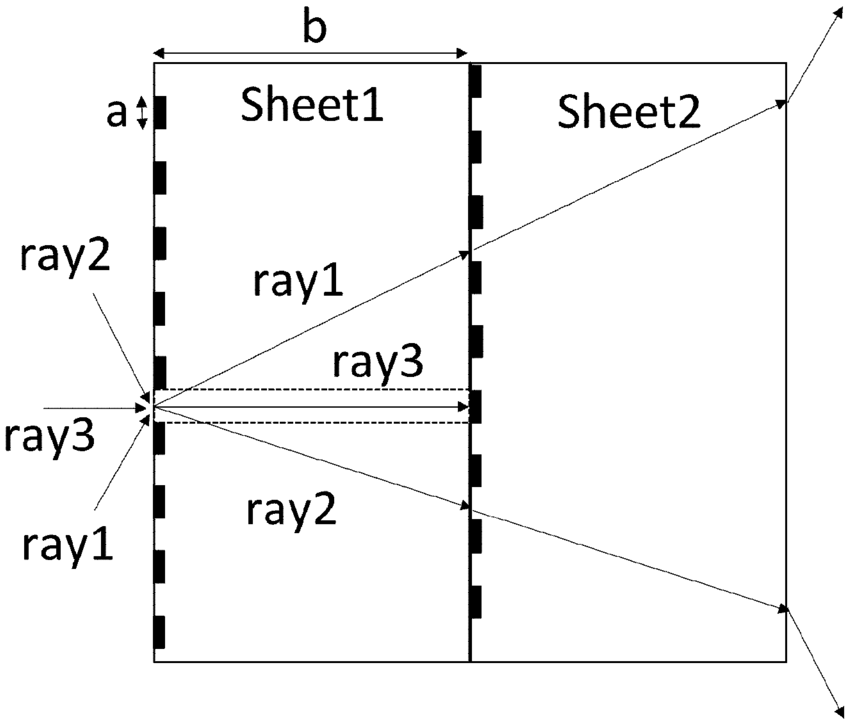
Figure 14:
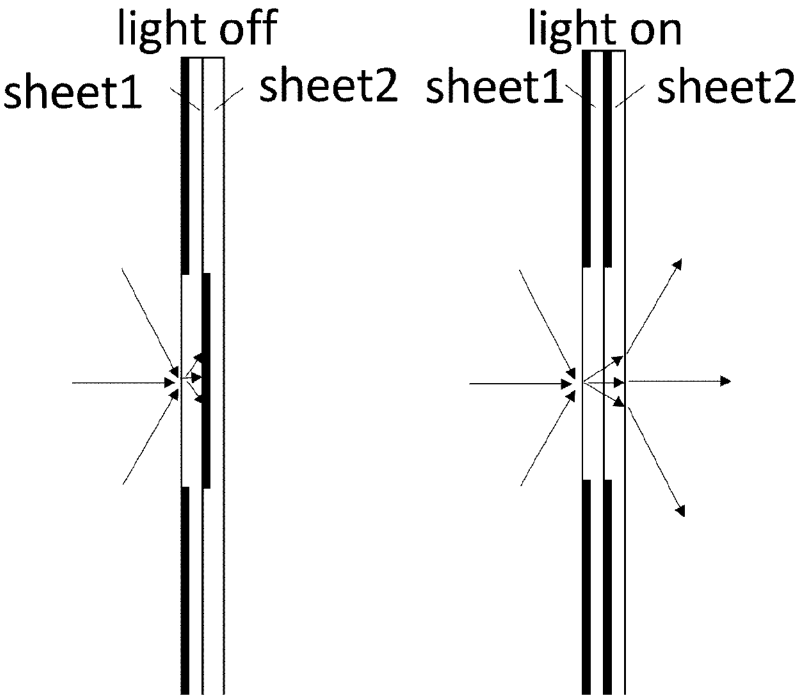
Figures 15, 16:
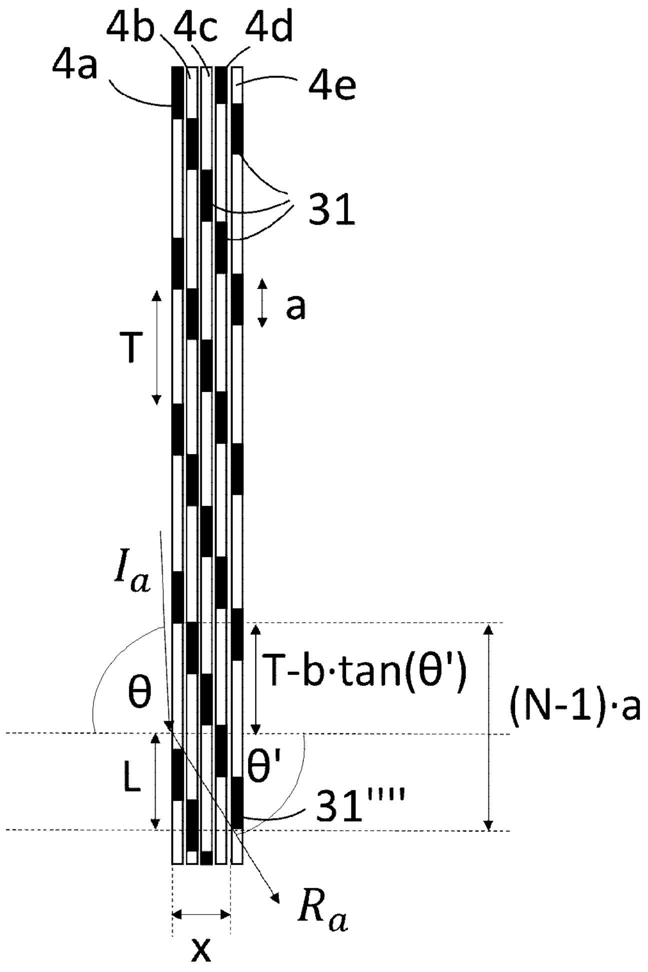
Figure 17A:
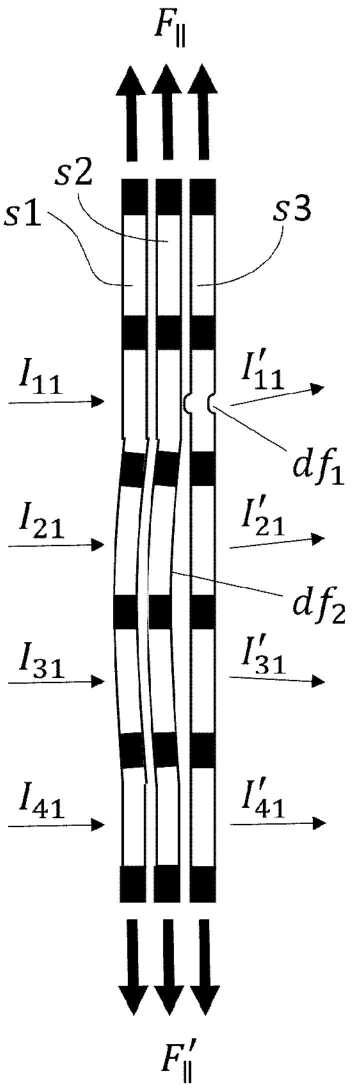
Figure 17B:
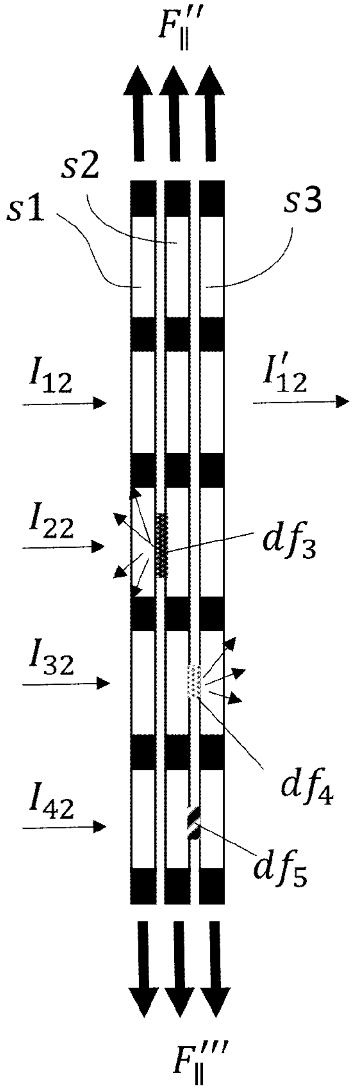
Figure 18:
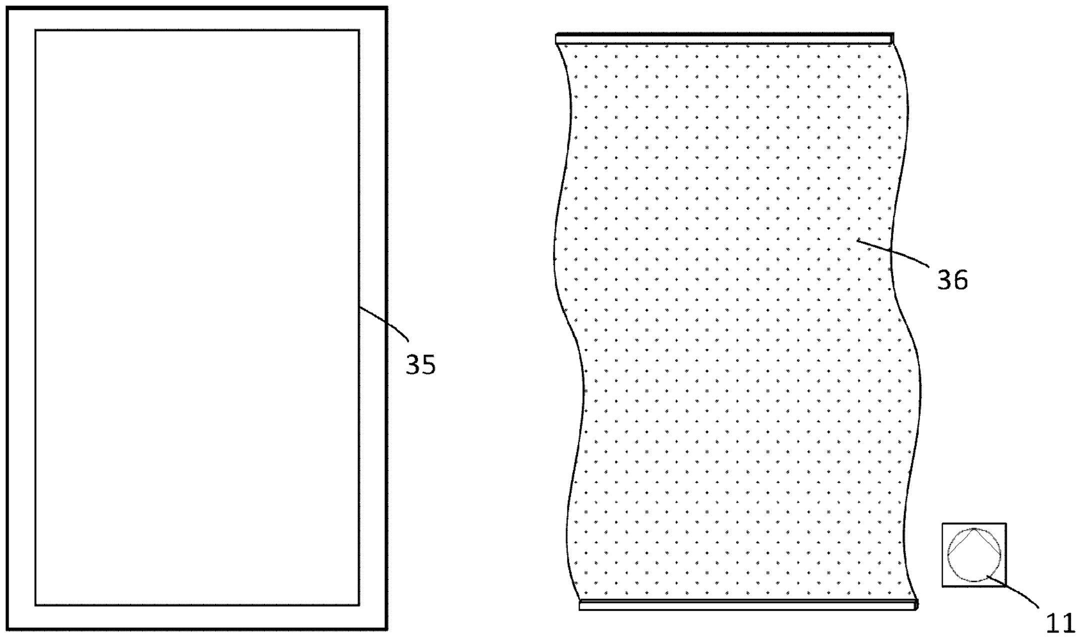
Figure 19:
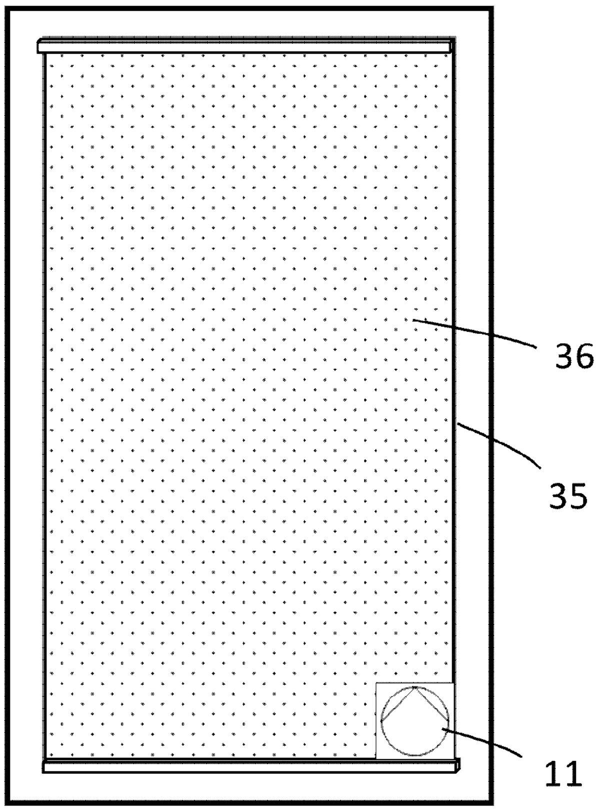
Figure 20:
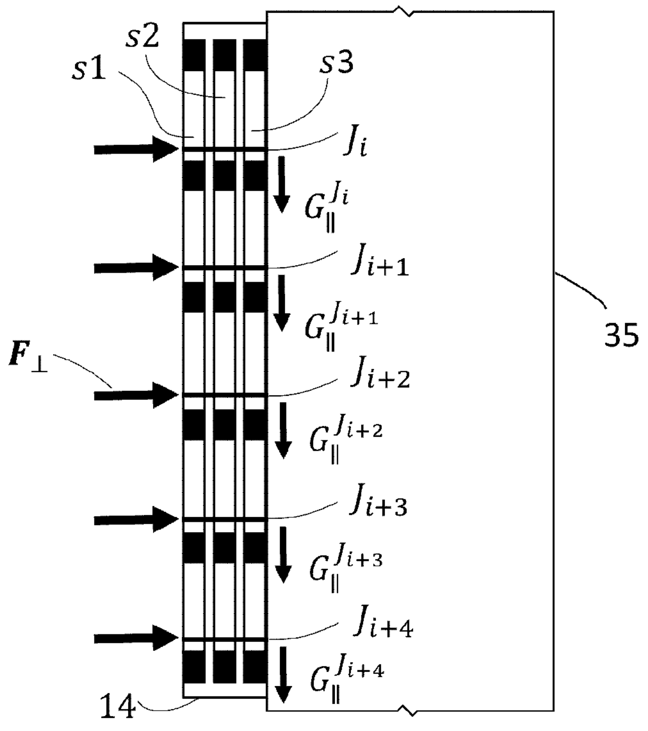
Figures 22A, 22B, 22C:
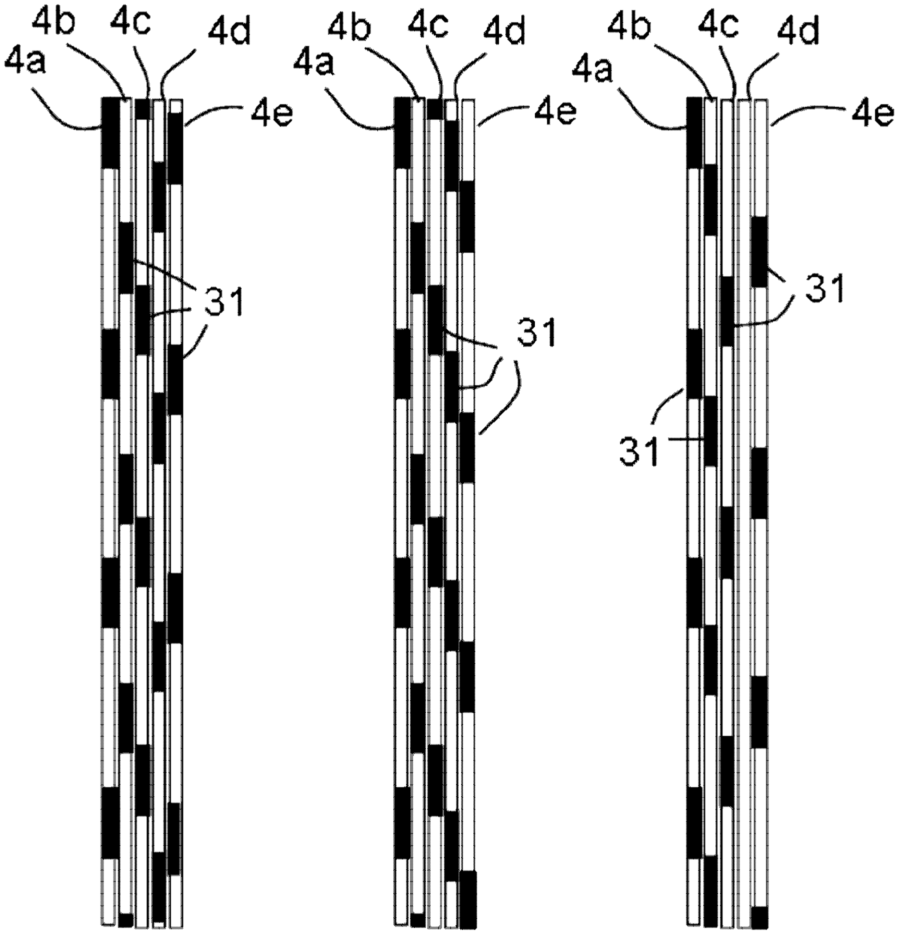
Figure 23A:
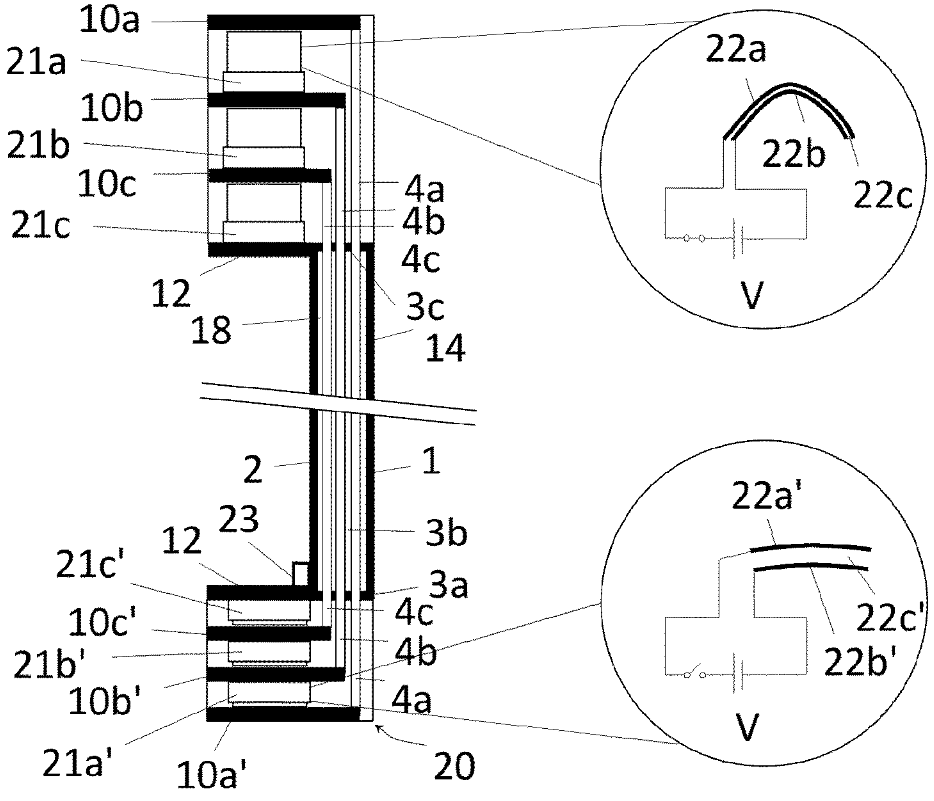
Figure 23B:
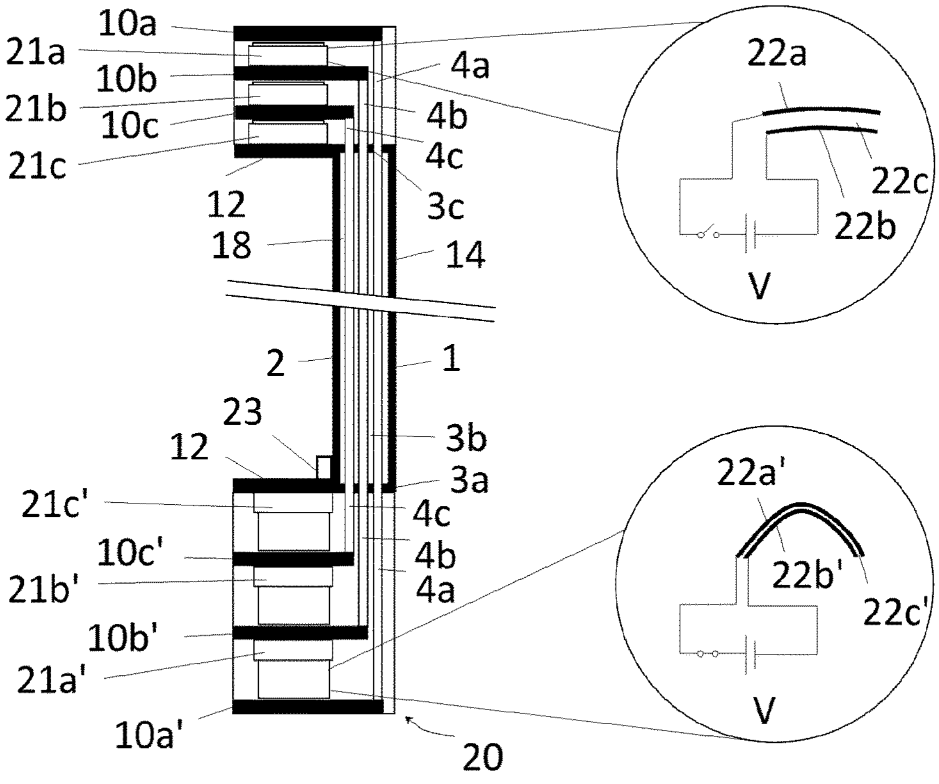

FIG. 3: is a longitudinal section of an idealised prior art system;

FIG. 4: is a table showing the transmission of a prior art system;

FIG. 5*a* is a longitudinal section of an embodiment of the invention in a first position;

FIG. 5*b* is a longitudinal section of an embodiment of the invention in a second position;

FIG. 6 is a longitudinal section of an embodiment of the invention;

FIG. 7 is a table showing the transmission of this embodiment;

FIGS. 8*a* to 8*b* are illustrations of total internal reflection (TIR) and frustrated total internal reflection (FTIR), respectively;

FIG. 9 is an illustration of tunnelling through a rectangular potential barrier;

FIG. 10 shows transmission as function of surface separation for FTIR, at 45° angle of incidence, at 550 nm and refractive index of 1.5;

FIG. 11 shows transmission across a gap as function of surface separation, at normal angle of incidence, at 550 nm and refractive index of 1.5;

FIGS. 12*a* to 12*d* are illustrations of refractive index profiles across two adjacent sheets;

FIG. 13 is a longitudinal section of an embodiment of the invention;

FIG. 14 is a longitudinal section of an embodiment of the invention in two positions;

FIG. 15 is a longitudinal section of another embodiment of the invention in a second position;

FIG. 16: is a table showing the value of p, a parameter representing the necessary size of an opaque region to completely block light, for a given number of sheets and for a given ratio of a dimension of an opaque region and sheet thickness;

FIGS. 17*a* and 17*b* are illustrations of thin sheet defects and their impact on incident rays;

FIG. 18 is a front elevation of an embodiment of the invention showing the installation process;

FIG. 19 is a front elevation of the embodiment of FIG. 18 when installed;

FIG. 20 is a longitudinal section of an embodiment of the invention when installed;

FIGS. 21*a* to 21*d* are illustrations of thin sheet binding methods;

FIGS. 22*a* to 22*c* are longitudinal sections of other possible embodiments of the invention;

FIG. 23*a* is a longitudinal section of an embodiment of the invention in a first position; and FIG. 23*b* is a longitudinal section of an embodiment of the invention in a second position.

MECHANICS OF THE DEVICE

Referring to FIG. 5*a*, the light modification apparatus comprises a plurality of sheets 4*a*, 4*b*, 4*c* enclosed in a capsule 14, with upper and lower support and actuation mechanisms 9, 20.

The sheets 4*a*, 4*b*, 4*c* are enclosed within a form of a protective capsule 14, the capsule having a window-facing wall 1 and an inside wall 2 approximately coextensive with the sheets 4*a*, 4*b*, 4*c*, and a top wall 3*c*, side walls 3*b* and bottom wall 3*a*.

In use, the apparatus is ideally installed in an existing window, with the wall 1 facing the window pane (not here shown).

The upper edge of the sheets 4*a*, 4*b*, 4*c* each feature an upper flange 10*a*, 10*b*, 10*c*, the upper edges of the sheets being offset from one another so that the upper flanges 10*a*, 10*b*, 10*c* are arranged in a stacked formation on top of each other. The lower edges of the sheets 4*a*, 4*b*, 4*c* each feature a similar lower flange 5*a*, 5*b*, 5*c*, again the lower edges of the sheets 4*a*, 4*b*, 4*c* being offset so that the flanges lie on top of each other.

The upper flange 10*a*, 10*b*, 10*c* and the upper edges of the sheets 4*a*, 4*b*, 4*c* are encased in an upper support 9 comprised of elastic resilient material, and similarly the lower flange 5*a*, 5*b*, 5*c* and lower edges of the sheets 4*a*, 4*b*, 4*c* are encased in a lower support 6 also composed of an elastic material. The elastic modulus of the upper support 9 has a high elastic modulus relative to the lower support 6.

The sheets 4*a*, 4*b*, 4*c* extend through the top wall 3*c* and bottom wall 3*a* of the capsule 14 at their respective upper and lower extents; the material of the upper support 9 and lower support 6 seals the capsule 14, so that it defines a sealed volume. The volume of the capsule 14 is filled with a liquid 18, this liquid occupying the volumes between each neighbouring sheet, as well as the volumes between the window-facing wall 1 and sheet 4*a*, and the inside wall 2 and sheet 4*c*.

At the bottom of the device is a lower support and actuation mechanism 20, comprising bellows 16 attached to a pump 11. The bellows 16 comprises a series of hard partitions 7*a*, 7*b*, 7*c* whose edges are spanned by flexible pockets 8*a*, 8*b*, so as to form a concertina-like structure, which is sealed to the outside environment except for the port leading to the pump 11. The pump may be operated to inject air into the bellows 16, and to extract air from the bellows when reversed.

The partitions 7*a*, 7*b*, 7*c* are connected to lower flanges 5*a*, 5*b*, 5*c* as illustrated. When the pump 11 is actuated to inject air pressure into the said air chamber, and after the air chamber has sufficiently expanded (FIG. 5*b*), the sheets 4*a*, 4*b*, 4*c* have moved to compensate for the movement of the air chamber via the lower flanges 5*a*, 5*b*, 5*c*, and the material of the lower support 6 has also expanded. The partitions 7*a*, 7*b*, 7*c* expand equally, so that the distance between adjacent lower flanges 5*a*, 5*b*, 5*c* increases equally. This causes each of sheets 4*a*, 4*b*, 4*c* to translate downwards relative to the capsule, the sheet 4*a* moving downwards the greatest amount.

The relative movement of the sheets 4*a*, 4*b*, 4*c* causes the material of the upper support 9, to contract. The upper flanges 10*a*, 10*b*, 10*c* are brought closer together. Ledge 12 is fixed, and constrains the movement of the upper support 9.

After some time, when the pump's action is removed and air is allowed to exit said air chamber, the force compressing material 9 will have been removed, and since the material of the upper support 9 has a higher elastic modulus than the material of the lower support 6, the upper support 9 will then revert back to uncompressed state and exert a force onto sheets 4*a*, 4*b*, 4*c* with the upper flanges 10*a*, 10*b*, 10*c*. Similarly, the material of the lower support 6 will have a tendency to revert back to unstretched state so that all forces opposing movement of sheets 4*a*, 4*b*, 4*c* back to original state will be lower compared to forces acting to restore the sheets back to original state. The apparatus will hence revert back to the state shown in FIG. 5*a*. As an aside, it is noted that in addition to the two modes described here, namely, one with the maximum amount of light transmitted ('light-on'), and the other with the minimum amount of light is transmitted ('light-off'), other modes are envisaged whereby shading amount can be adjusted on demand to any value between these two modes.

The lower flanges 5*a*, 5*b*, 5*c*, whose main purpose is as a connector between the lower support and actuation mechanism 20, and the sheets 4*a*, 4*b*, 4*c*, translates the actuation force onto said moving sheets, whilst also serving as obstacle restricting sheet movement relative to each other beyond a stop point. As noted, the material of lower support 6 is a flexible type of material, such as an elastomer, and is connected to the end of the said capsule 14 as well as to sheets 4*a*, 4*b*, 4*c* and lower flange 5*a*, 5*b*, 5*c* such that air flow into the region within the capsule, is either substantially reduced or is completely restricted.

At the upper region of the capsule at the top wall 3*c*, as previously noted, is an elastic type of material 9, which also acts to connect top wall 3*c* with the moveable sheets 4*a*, 4*b*, 4*c* and their corresponding upper flanges 10*a*, 10*b*, 10*c*, which also restricts or completely eliminates exchange of air between the capsule and the surrounding area. The moving sheets 4*a*, 4*b*, 4*c* and the inside wall 2 of the capsule 14, are encased into an enclosure such that they are protected from external factors such as water vapour, dust, and oxygen, whilst at the same time enabling movement of said sheets 4*a*, 4*b*, 4*c*. This permits the air pressure difference between the outside environment and the inside of the capsule to be controlled.

In this particular embodiment the inside wall 2 and window-facing wall 1 are not physically moveable, but there are other embodiments not here shown where it could be arranged so that the inside wall 2 and window-facing wall 1 are moveable relative to one another, e.g. where wall 1 is stationary and the inside wall 2 is moveable, or alternatively, where wall 1 is moveable and the inside wall 2 stationary.

Optical Properties of the Sheets

In the embodiment of FIG. 5 window-facing wall 1 is completely transparent and does not have any optically active regions (no optically opaque regions). In contrast, inside wall 2 although not moveable, is optically active in that it is one of the sheets consisting of alternating regions that are transparent and optically active (opaque) as described in previous sections.

Figure 1:
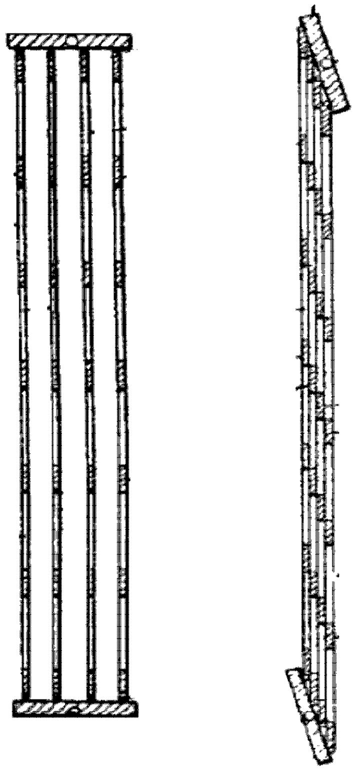
FIG. 1 PRIOR ART
FIG. 1 is a longitudinal section of a prior art system in two positions.
Figure 2:
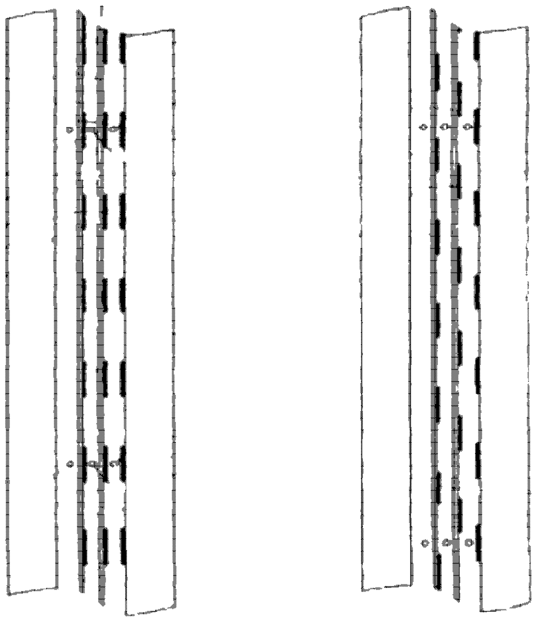
FIG. 2 is a longitudinal section of a further prior art system in two positions.

Now referring to FIG. 6, each sheet 4*a*, 4*b*, 4*c* is formed with optically opaque regions 31 and optically transparent regions 30, the optically opaque regions 31 conveniently arranged as horizontal strips or bars, in a similar general manner to the known systems shown in FIGS. 1 and 2.

The positions of the sheets 4*a*, 4*b*, 4*c* in FIG. 5*a* could be in the 'light-on' mode, with the optically opaque regions 31 of each of the sheets being horizontally aligned. In comparison, the position of the sheets 4*a*, 4*b*, 4*c* in FIG. 5*b* could be in the 'light-off' mode, with each optically opaque region 31 being non-coincident, so that the sheets together block all light.

As previously described and illustrated in FIGS. 5*a* and 5*b*, the sheets 4*a*, 4*b*, 4*c* are spaced from each other, and sheet 4*a* is spaced from the inside wall 2 of the capsule and sheet 4*c* is spaced from the window-facing wall 1 of the capsule 14, and a liquid 18 occupies the volume between the sheets 4*a*, 4*b*, 4*c* and the inside wall 2 and the window-facing wall 1. This liquid 18 optically connects the sheets 4*a*, 4*b*, 4*c*. Ideally, liquid 18, the inside wall 2, the window-facing wall 1, and the sheets 4*a*, 4*b*, 4*c* are all optically matched so as to form a single optically continuous medium. An additional benefit of liquid 18 is that it can act as a lubricant to reduce friction during sheet movement.

Optical Coupling between Sheets

As discussed, deployment of a medium with a matching refractive index can help to optically connect sheets so as to beneficially alter device transmittance and/or reflectance. In the most preferred embodiment of this invention, as shall be discussed in more detail in the following sections, optical connection between the sheets and the optical coupling material is perfect such that reflection is eliminated, not only between sheets of the unit but also between the window and the adjacent unit sheet (thus removing the $R_{01}$ reflection). The reflection $R_{21}$ at an outer sheet/air interface remains, but given $R_{01}$ is usually close to $R_{21}$, in a system comprising a window and N sheets, if $R_{01}$ is taken to equal $R_{12}$, equation (3) becomes $$I_2 = I_0 \cdot \left(1 - \frac{1}{N}\right) \quad \text{(equation 4)}$$

where, as before, $I_0$ represents the intensity of light ray impinging onto sheet surface (at normal angle of incidence), $I_2$ represents transmitted light intensity, and N is the number of optically active sheets.

Referring to FIG. 7, which shows $I_2$ values with $I_0$ again being 1, where sheets are optically connected, and more sheets are incorporated, possibly 10 or more, not only may transmissions greater than 90% be achieved, with 100% light blockage in the 'light-off' mode, but when combined with sub-mm feature size sheets are capable of being close to "invisible" to human eye in the 'light-on' mode. This is a key improvement on prior art.

To understand possible alternative methods by which transmission profile can be altered, other than coating sheets with an anti-reflective coating, we now discuss frustrated total internal reflection (FTIR), which is a well-known and studied phenomenon in optics. A variety of textbooks and literature on the subject is available, and for a general overview as well as the transmission coefficients references provided may be of interest (5, 6, 7, 10). The following section may help to address questions such as, are all abutting surfaces necessarily optically connected, or do surfaces have to be abutted to be optically connected.

Although FTIR is typically discussed in the context of cube beam splitter-type experiments, it's also relevant here because it's one of the easiest ways to visualise the effects of optical coupling since transmission can change from 0% to 100% depending on surface separation. FIG. 8 represents two optical grade polished prisms that have identical refractive index v' and are separated by an air gap of width d. With reference to FIG. 8(*a*), light ray enters one side of a prism such that it impinges onto the hypotenuse at an angle greater than the critical angle (which is in the region of 42 degrees for many laboratory-type prisms), so that the ray experiences total internal reflection (TIR). The transmissivity and reflectivity factors can be obtained classically, however the analogy to quantum mechanical tunnelling that is often made with FTIR, and indeed with many other optics phenomena, as in reference (6,9), is also noted here. To that end, FIG. 9 is provided as an illustration of wave tunnelling through a rectangular potential energy barrier of width w, where k represents the wavevector, z the distance, and A and B are the transmissivity and reflectivity coefficients, respectively.

The potential energy barrier in FIG. 9 is in some sense analogous to the difference in the refractive index, and the tunnelling distance w is analogous to the air gap width d.

Now, under TIR there is a transmitted evanescent wave that doesn't result in any power coupling into either the air gap or into the second prism. However, as the prisms are gradually brought closer together the evanescent wave starts having a greater impact, and at some distances power starts being noticeably transmitted even if the two prisms are not actually touching each other. For the effect to be noticeable the separation needs to be really small, as we shall now discuss.

FIG. 10 shows the FTIR transmitted intensity as function of separation d, at 550 nm and angle of incidence of 45° (classical electrodynamics yielding the transmission formulae, for further detail see literature, e.g. references (5, 6, 10)). At a separation of 1 μm less than 99.9% of light is transmitted, whereas at 100 nm roughly 75% is transmitted, and at 10 nm the transmission is greater than 99.5%. This is indicative of the kind of separations required for noticeable optical coupling to take place. In FTIR, as in various interferometric types of experiments, even one speck of dust can make the difference between a clear appearance or a complete disappearance of a given optical phenomenon. What this means in FTIR is that the prisms can have abutting surfaces but needn't necessarily be optically connected, and, contrastingly, surfaces can be close but strictly speaking do not have to touch to achieve noticeable optical connection. (Reference (7), although not directly relevant to any claims here, is a further example of a practical utilisation of this effect.)

For a more everyday example, based on materials such as standard plastic or glass that are not specially designed for optical experiments, pressing two panes together will not usually result in significant or noticeable optical connection, without other special arrangements. Broadly speaking this may be expected from FIG. 10 since typical materials with no special finishing methods such as polishing have surface roughness typically not lower than 1 μm (8).

Even though the FTIR example shows how reflection can be reduced at angles of incidence greater than the critical angle, increased transmission can also be achieved at other angles. The coefficient $T_{gap}$ in equation (5) below, based on classical optics using Fresnel equations, provides the relative transmittance through a rectangular air gap such as the one in FIG. 8*a*, but with the light ray traversing the gap in direction normal to plane surface (9, 10). (For a wider discussion including a quantum mechanical perspective refer to literature, such as references (10, 11)).

$$T_{gap} = 1/\left[\left(\sin(2\pi d/\lambda)\cdot\left(v'^2-1\right)/2v'\right)^2+1\right] \quad \text{(equation 5)}$$

According to equation (5), at λ equal to 550 nm and refractive index of 1.5, at 50 nm separation the transmission is greater than 95%, whereas at 20 nm the transmission increases to more than 99%, and at 10 nm the transmission is more than 99.7%. Therefore, again, virtually 100% transmission may in principle be possible without the sheets having actual contact. FIG. 11 is the corresponding plot of transmission as function of separation at 550 nm and refractive index of 1.5.

As suggested by equation (5) as well as FIG. 11, yet another alternative method by which transmittance may be altered is to purposefully separate neighbouring sheets by a fraction of a wavelength. For instance, for applications in the visible spectrum, assuming that sheets are separated by air, transmittance can be increased by keeping the separation as close to 280 nm as possible, which is close to a half of the wavelength of the peak of eye colour sensitivity. The two reflected rays, one at the sheet-air interface and the other at the air-sheet interface, would thus be one wavelength plus rt out of phase (as the phase shift occurs at only one of the interfaces), meaning that reflection would be minimised, and transmission in turn would be maximised. Referring again to FIG. 11, it is also noted that at λ/4 the two reflected rays would be half of a wavelength plus rt out of phase, meaning that reflection would be maximised, and transmission in turn would be minimised.

Refraction Index Profile

FIGS. 12*a* to 12*d* are now presented to visually illustrate the above optical coupling methods. Noting that these figures are simplifications given that surfaces will typically contain imperfections, small-scale surface of each sheet can vary, and sheets could be composed of more than one material, etc, nevertheless these may be useful to illustrate key principles of each of the methods.

Before further discussion, it's also noted that in a typical embodiment most or all of the sheet interface area is optically connected, both in the 'light-on' and in the 'light-off' mode, as well as in any in-between modes. However, other embodiments may also be possible where only a portion of the total sheet area is optically connected in only one of the light transmission modes (e.g. in the 'light-on' mode).

Figure 12A:
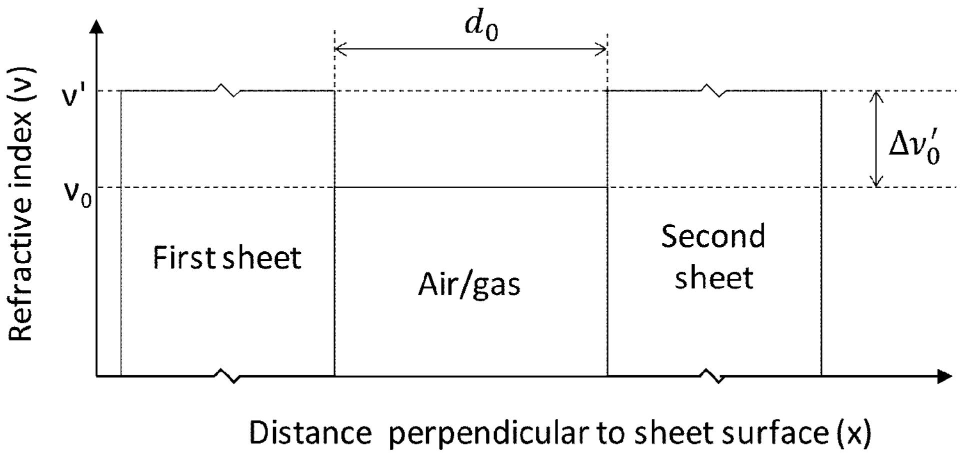

Now, FIG. 12*a* is a representation of a generic refractive index profile across two adjacent sheets, wherein an air/gas medium with refractive index $v_0$ fills the interface volume, and wherein v' is the refractive index of both the first sheet and the second sheet. (Note that, though not shown in any of FIGS. 12*a* to 12*d*, it's understood that the refractive index may also vary between sheets, this not being of central importance to this discussion.) The refractive index difference between the sheet and the gaseous medium is $$\Delta v'_0,$$

whereas $d_0$ represents the separation between the sheets, and $d_0$ being a generic distance of the order of 1 μm or more (little or no significant FTIR). (Incidentally, as an orientation, a typical reflection coefficient at normal angle of incidence, for a typical sheet/gas interface with $$\Delta v'_0$$

close to 0.4, may be around 4%.)

Figure 12B:
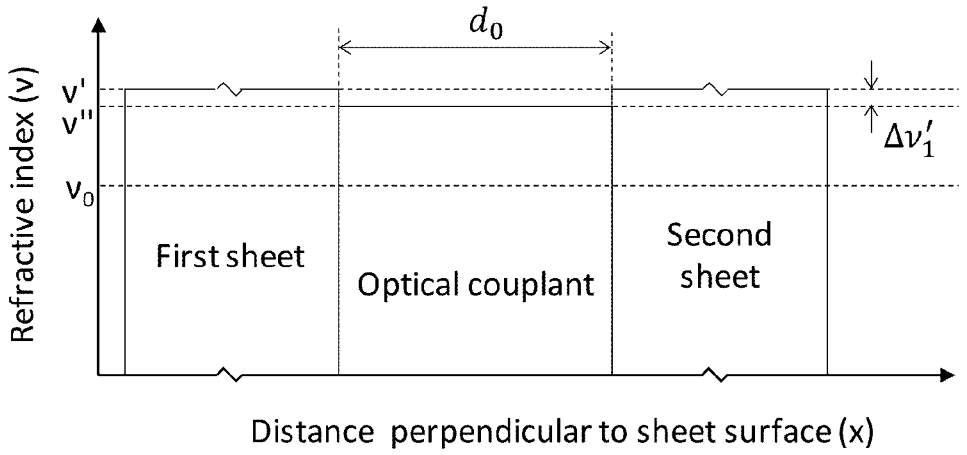

FIG. 12*b* shows the refractive index profile across the same sheet interface but with an optical coupling material ("optical couplant") with refractive index v" introduced so that air/gas is fully expelled from the interface. Note that, in comparison to the refractive index discontinuity $$\Delta v'_0$$

associated with gas, the new refractive index discontinuity $$\Delta v_1'$$

is significantly smaller. Also, note that herein we refer to the term "optical couplant" to mean any material placed between sheets in order to reduce the optical discontinuity that a single photon experiences as it traverses from one sheet to the next, whether by way of reduction of the refractive index difference, or by way of reduction/control of sheet separation.

A number of different materials could be utilised to minimise or possibly even completely eliminate the refractive index discontinuity $$\Delta v_1',$$

whilst still allowing sheet movement relative to an adjacent sheet (i.e. a non-curing type of material). In the most preferred embodiment, the optical couplant may be a simple liquid such as an oil. However, other materials could also achieve a similar desired effect without majorly impacting on the key claims in this document. Various types of colloids including known optical greases, gels, creams, aerogels, or other jelly-like, viscoelastic, elastomer, rubbery/soft, malleable putty, and other suchlike materials, are possible candidates. In addition to a number of currently known such materials, it's also worth noting that new materials are continually being developed. As an example, various versions of liquid silicon rubber have been developed over the last decades, whether by alterations of key chemical groups, changes to molecular arrangement and phase structure, introduction of additives, or other approaches. A variety of liquid silicon rubber materials is now commercially available, with varying physical, optical and chemical characteristics. But whether it's by using liquid silicon rubber or other varieties such as various types of copolymers, nanoparticle, composites, etc, materials can be developed virtually on demand with a desired set of physical (e.g. malleability, adherence to a surface), optical (e.g. transparency, refractive index, colour) and chemical (e.g. chemical stability) characteristics.

One possible material combination that may be a suitable candidate for the most preferred embodiment (factoring in optical, physical, as well as economic aspects) is now noted, targeting $$\Delta v_1'$$

in the region of 0.01 or less over the 500-650 nm range, which covers the peak of human eye colour sensitivity. PMMA—poly(methyl methacrylate) sheets have refractive index between 1.49 and 1.50 in the 480-630 nm range (for a more in-depth review of refractive index variability see reference (12)). This could thus be favourably combined with high index versions of silicone oil, with refractive index of 1.49. Other types of oils, even olive oil, have refractive indices close to 1.5. Also, numerous optical coupling oils, greases, gels, are commercially available with a refractive index close to 1.5. Glycerol, with refractive index of 1.47 is yet another possibility, potentially by mixing with other liquids and/or gels to achieve a mixture with an optimum set of characteristics. Other matching combinations with differences even less than 0.01 over the peak of human eye colour sensitivity could be targeted, especially over the 480-630 nm range, but even more preferably between 400 and 700 nm. It also may in principle be possible to use water, either by itself or mixed with other substances (e.g. NaCl/sucrose/glycose) to achieve an acceptable $$\Delta v_1'.$$

Note that at normal angle of incidence, with $$\Delta v_1'$$

of 0.1 (v" of 1.4 and v' of 1.5), only 0.1% of light is reflected at the interface versus 4% at $$\Delta v_0'$$

of 0.5 ($v_0$ of 1.0 and v' of 1.5). Even at angle of incidence of 60° to normal the difference is more than 10-fold: 0.8%

$$(\Delta v_1' \text{ equal to } 0.1) \text{ vs } 9\% \, (\Delta v_0' \text{ equal to } 0.5)$$

Figure 12C:
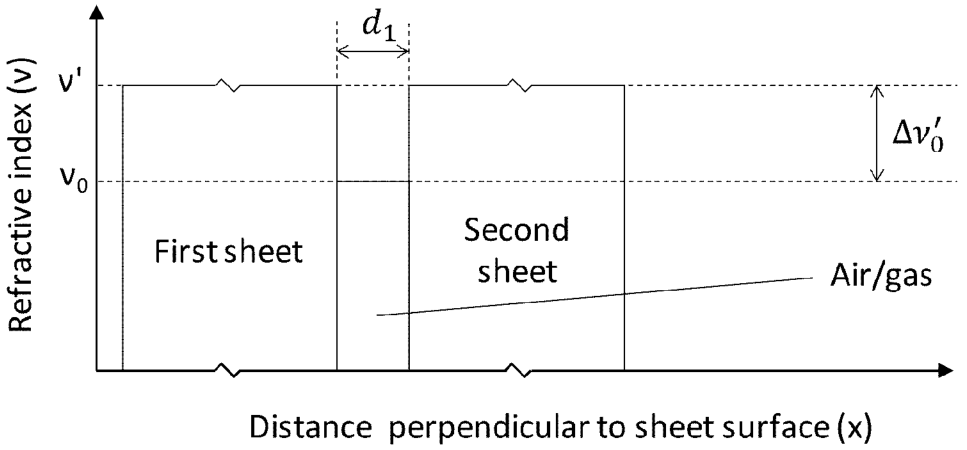

FIG. 12*c* illustrates the alternative method of optical coupling, wherein an air/gas medium still fills the interface and the refractive index discontinuity is still $$\Delta v_0',$$

the same as in FIG. 12*a*, however the distance between the sheets is $d_1$, with $d_1$ being much smaller than $d_0$. According to the principles outlined earlier, neighbouring sheets can be optically coupled by arranging $d_1$ to be really small, preferably less than 400 nm. (In a practical arrangement where surface separation may vary across the small-scale, this means that the average surface separation is less than 400 nm, with the standard deviation being significantly smaller than the average; preferably not exceeding 100 nm, or even more preferably, 10 nm.) Close to perfect coupling can be achieved with $d_1$ of the order of a few nanometres (the standard deviation of $d_1$ also not being greater than few nanometres). Alternatively, also as per the above outlined methods, for applications in the visible spectrum, $d_1$ can be arranged to be in the region of 280 nm (again, with a much smaller standard deviation; less than 100 nm or more preferably less than 10 nm). Numerous types of materials, manufacture methods, interface engineering techniques, etc, could be deployed to achieve such surface separations. To name but a few possibilities, materials can be produced with surface roughness reduced according to requirements (e.g. below 10 nm), so that when sheets are forced or pressed against each other optically functional areas of adjacent sheets are separated by distances that are in the nm range, say 20 nm or less. One such possibility is polishing, for instance see references (8). Also note forcing/pressing of adjacent sheets together are capabilities of embodiments here described, for instance by way of control of air pressure difference in capsule 14, or by use of electrostatic effects described in further detail in one of the following sections. Also note that, although FIGS. 12*b* and 12*c* show the first and the second sheet each having a constant refractive index, sheets can be composed of multiple materials, such as being coated with a thin layer of elastomer or rubber-like material (such as a malleable transparent version of silicon rubber), wherein an optical connection can be achieved by a similar type of forcing/pressing of sheets together. Additionally, sheets can be manufactured from a soft rubber-like material rather than a hard plastic material. To achieve a specific surface separation, say 280 nm (or some other λ/2), ridges of required height can be deposited onto sheet material (e.g. by photolithography), or alternatively, nanoparticles of required size can be deposited between sheets, such that the total density of the added ridges, or of added particles, is low and doesn't cover more than a few percent of the total volume of the sheet interface area.

Figure 12D:
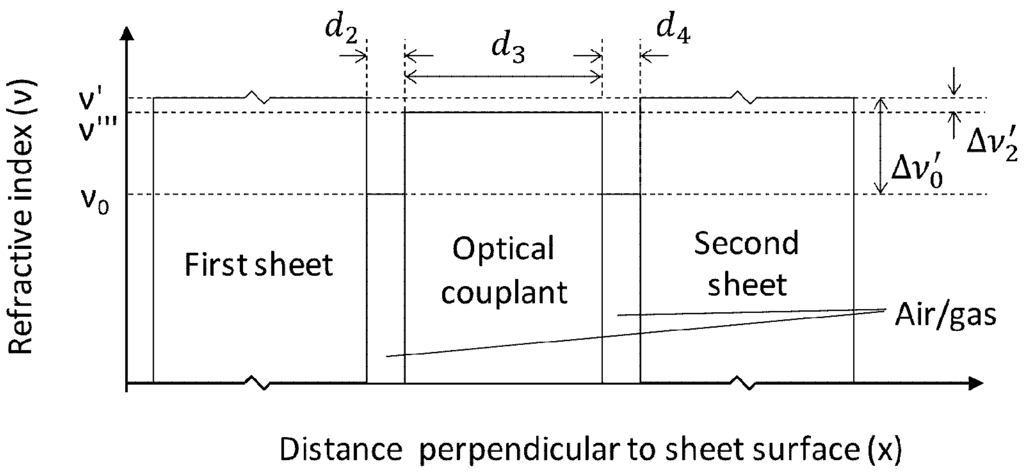

Finally, FIG. 12*d* is an illustration of optical coupling by placement of an optical couplant with refractive index v''' and width $d_3$ into the area between the sheets, and with a reduction but not complete elimination of air/gas from the interface, such that air pockets of widths $d_2$ and $d_4$ still exist, $d_2$ and $d_4$ each being smaller than $d_0$ as well as $d_1$. (Note that, although only two air pockets are illustrated, there could in principle be one or more than two, whilst the essence of the discussion would remain unchanged.) Such profiles could be advantageous in certain embodiments in order to maximise optical transparency/clarity characteristics, whilst minimising undesired physical characteristics, such as sheets being held together too tightly to prevent sheet movement. Also, the profile such as that in FIG. 12*d* could arise inadvertently if the volume in the interface is filled with an optical couplant, but small pockets of air remain trapped, for instance at areas of surface irregularities.

Further note that light traversing a multi-sheet optically discontinuous structure may additionally be subjected to interference from non-neighbouring sheet reflections, such as for instance due to reflections from two sides of a same sheet, or two sides of non-neighbouring sheets. However, as sheets may typically be at least dozens of microns thick (in some embodiments even dozens of millimetres, or even thicker), the separation of these interfaces is much greater in comparison to any of $d_1$, $d_2$, $d_3$, $d_4$ (these targeted to be less than 400 nm here, as per above discussion). Hence, especially as the variance of these separations can be arranged to exceed $\lambda^2$, for brevity and for the purposes of the discussion here these effects are deemed to be small or negligible in comparison to the above described interreference effects at a neighbouring sheet interface.

Performance Measures

There are many ways of assessing optical shutter/shade device performance characteristics, and various factors could be taken into consideration, including light transmission, light blockage capability, optical clarity of transmitted images, and even colour profiles, proneness to degradation, etc. The choice of the model that best represents device performance can therefore be a matter of the intended device application, and there is unlikely to be a single best way to assess performance for all possible device applications. With that in mind equation (6) below is provided as one possible measure, focusing only on two key capabilities: i) the maximum amount of light transmitted through the sheet area when in 'light-on' mode, and ii) the minimum amount of light transmitted through the sheet area when in 'light-off' mode. For many consumer applications the former would ideally be 100% of haze-free transmission and the latter would be 0%.

$$P=\left(1-T_{min}/T_{max}\right)\cdot\sqrt{T_{max}(1-T_{min})\cdot e^{(-k_1\cdot T_{min}-k_2\cdot(1-T_{max}))}} \quad \text{(equation 6)}$$

Here $T_{max}$ is the maximum amount of randomly oriented non-polarised light, expressed as a % of the total light impinging onto the light entry side, the device is capable of letting through the light exit side; $T_{min}$ is the minimum amount of randomly oriented non-polarised light, expressed as a % of the total light impinging on the light entry side, the device is capable of letting through the light exit side; $k_1$ is a modelling constant representing how important the light blockage is to the consumer application in mind; $k_2$ is a modelling constant representing how important the light transmission is to the consumer application in mind. Once again, the choice of equation as well as the values of constants is a matter of modelling choice. Also note that equation (6) does not explicitly model/factor-in visual appearance or appeal of the device, such as surface texture, clarity of optical images transmitted and/or reflected through/from the device, nor does it capture the visual appeal of the opaque/transmissive regions. Although equation (6) itself is not critically relevant to any of claims in this document, it may nevertheless be helpful to illustrate more generally how the performance and scope of applicability are impacted by variations in device parameters.

For brevity, as these phenomena are not critically relevant to claims in the following elements of the invention, the description below assumes that the impact of resonant coupling and of light interference phenomena, that may be associated with light traversing a multi-sheet optically-discontinuous structure, is small to negligible.

Referring to FIG. 13, two sheets are considered (i.e. N=2) to illustrate how the light blocking characteristics are affected when the dimensions of the opaque regions are altered. The dimension of the optically opaque region is represented by the parameter a, and the parameter b represents sheet thickness, with b being approximately 10 times greater than a. If we define r as the ratio a/b then for this case r is close to 0.1. At this r range, relative to the proportion of total light coming into sheet 1, less than ½ of randomly directed light is transmitted into sheet 1 and a similar proportion is transmitted from sheet 1 into sheet 2, so that light intensity exiting from sheet 2 is only a fraction of light entering into sheet 1. If $k_1$ and $k_2$ are arbitrarily both taken to equal 1, and $T_{min}$ and $T_{max}$ to have representative values of 15% and 20% respectively, then equation (6) yields P close to 6%.

Next, consider another two-sheet arrangement but now for a different case, where r is closer to 10. With reference to FIG. 14 and in comparison to the above case with r closer to 0.1, in the 'light-off' mode much more of the light is blocked off ($T_{min}$ is lower than in FIG. 13), and in the 'light-on' mode much more of the light is transmitted through ($T_{max}$ is greater than in FIG. 13). If $k_1$ and $k_2$ are again arbitrarily both taken to equal 1, but now with representative $T_{min}$ and $T_{max}$ of 1% and 40% respectively, then equation (6) yields P close to 45%, which is consistent with the parameter P being greater at high r compared to low r.

Although these two examples have been provided for illustration only, for many if not most devices of this type, greater $T_{max}$ and lower $T_{min}$ can generally be achieved at r much greater than 1 compared to r much lower than 1.

Performance of a light-shading device and scope of applicability is therefore not generally independent of sheet thickness and/or the number of sheets, especially if using thin sheets, and even more so with low feature dimensions.

As a further example of this, consider the dimensions that are required in order to completely block light when in the 'light-off' mode. Referring to FIG. 15, a system is shown having 5 sheets 4*a* to 4*e*, all of which are optically active, that is, they have opaque regions 31 on transparent sheets (or some second transmissivity). The opaque/reflective material extends through the whole of the sheet thickness as shown, rather than just sitting as a thin layer at the sheet surface. In this arrangement, a light ray $I_a$ having an angle of incidence of θ with the first sheet 4*a* will be refracted to path $R_a$ having an angle of incidence of θ' as determined by Snell's law. The maximum θ' of light ray $R_a$ is attained when the angle of incidence of θ of $I_a$ is nearly 90°. For a given number of sheets of given thickness, the opaque regions can be arranged such that any light ray having an angle of incidence up to and including the maximum θ' will always be intercepted by one of the opaque regions. In this manner, complete blockage of light can be achieved if desired.

More formally, where light enters the sheet medium having a refractive index v', it will travel a distance vertically L (from where the light ray $I_a$ enters the first sheet to the bottom edge of opaque regions 31""), and distance x horizontally (from the leftmost surface of sheet 4*a* to the leftmost surface of sheet 4*e*).

From Snell's law $$v_0 \cdot \sin(\theta) = v' \cdot \sin(\theta') \quad \text{(equation 7.1)}$$

$$\theta' < \sin^{-1}(v_0 \cdot \sin(\theta)/v') \quad \text{(equation 7.2)}$$

If for example refractive indices for the air $v_0$ and the sheet material v' are assumed as $v_0=1$, v'=1.5, θ<90, then θ'<41.8 deg.

So, due to Snell's law the maximum angle the refracted ray can travel is below 41.8°. The x distance traversed by the refracted ray is from the entry point of sheet 4*a* to entry point of last sheet 4*e*. Since above arrangement applies for N of 3 or more, then the x distance is (N−1) b (where b is the thickness of each sheet as per FIG. 13).

Now, equation (4) applies to rays at normal angle of incidence and N sheets, with 1/N of each sheet opaque. Referring to FIG. 15, in order to completely block rays at normal angle of incidence the ratio a/(T+a)=1/N would suffice. So, for given value of T the value of the parameter a required for blocking all light at normal incidence is:

$$a = T/(N-1) \quad \text{(equation 8.1)}$$

Now *p* is defined as follows:

$$a = p \cdot T/(N-1) \rightarrow T = a \cdot (N-1)/p \quad \text{(equation 8.2)}$$

such that it satisfies the following criteria; based on geometry in above figure, we can write:

$$(N-1) \cdot a = T - b \cdot \tan(\theta') + L \quad \text{(equation 8.3)}$$

$$p = 1/\left[1 - (N-2) \cdot \tan(\theta')/[(N-1) \cdot r]\right] \quad \text{(equation 8.4)}$$

Referring to FIG. 16, a table of p values for given N and r is shown. As an example, for r=10 and N=5, p is 107% meaning that, relative to the value of parameter a in equation 8.1, the opaque region dimension needs to increase by 7% in order to block the ray in FIG. 15.

Note that, though not shown here, a number of similar methods could be used to derive the impact on P by variations in different parameters, or to arrive at parameter combinations that yield a given P. For instance, separation between sheets could also impact P; increasing the separation may have an effect similar to that of reducing r, i.e. P may decrease with increasing separation. Furthermore, whilst in some aspects it may be desirable to reduce the opaque feature dimensions to sub-mm levels, P may be adversely affected unless due consideration is given to other parameters (especially r, r/N, and/or, sheet separation). Moreover, although a given parameter combination can yield a low $T_{min}$, P does not necessarily improve as a result. For example, a $T_{min}$ of 0% can in principle be achieved even with N of 2, however this can result in $T_{max}$ decreasing (relative to a higher N, such as 3), not only because a greater proportion of rays just outside of the sheet material encounters an opaque region, but also because inside the sheet material a greater proportion of rays meet an opaque region whilst traversing the sheet at angles away from the normal angle (a sideways light loss), this reduction being especially significant at low r.

In summary, variations in different parameters, including variations in N, a, b, r, sheet separation, and other variables, and indeed their unique sets of combinations, can result in significant variations in performance (whether measured by equation (6) or other suitable method) as well as scope of applicability. Now, as will be expanded upon in further detail in the following sections, a number of characteristics and features of the glazing unit of this invention make it possible for the unit to be used as described below.

Dimensions and Weight

Referring back to FIGS. 5*a* and 5*b*, note that in this embodiment there is no dependency on a heavy clamp-type frame, cams, shafts, large metal parts, etc. Also note that there are no suspended parts that could result in a component inadvertently imparting its momentum onto a nearby object. A relatively low amount of actuation mechanism material is capable of exerting a force in order to translate sheets between different positions. Further, given the general unit characteristics, as well as the intended areas of application, in a typical embodiment the maximum distance any single sheet needs to move by is below 1 mm, though distances between 1 m and 1 cm are also possible, with 5 cm being the upper limit for the most common embodiments.

Height of the sheets 4*a*, 4*b*, 4*c* and the inside wall 2 and window-facing wall 1 of the capsule 14 may be in metres according to the demands of the application, whereas the thickness of the sheets 4*a*, 4*b*, 4*c* and the walls of the capsule (particularly the inside wall 2 and window-facing wall 1, but also the top wall 3*c*, side walls 3*b*, and bottom wall 3*a*) may be sub-millimetre. Pump 11 can be operated by hand or by an electric motor, and in the preferred embodiment is not larger than few centimetres in length, width and height. The maximum distance from the top of any of the hard partitions 7*a*, 7*b*, 7*c* to the corresponding sheet may be no more than few centimetres, or possibly sub-centimetre. At absolute most, the total volume of material required per $1m^2$ square coverage, including the sheets and all of the components of the actuation mechanism, needn't exceed 1000 $cm^3$.

In a possible embodiment constructed for 0.5 $m^2$ square coverage, without an optical connection between sheets, the weight of sheets in a device consisting of 3 optically active sheets with combined sheet thickness of less than 200 microns and sheet material volume below 100 $cm^3$, needn't exceed 0.1 kg. The parameter r being greater than 3, the light modulating features may consist of an opaque reflective strip of white frost appearance having a height of less than 500 microns, that is fully opaque in the 400-700 nm range, and has high (metal-like) reflectivity in the 700-1400 nm (IR and NIR) range as well as in the visible range.

The combined volume of components directly involved in actuation, which in the embodiment in FIG. 5 corresponds to materials 9 and 6, flanges 5*a*, 5*b*, 5*c*, 10*a*, 10*b*, 10*c*, ledge 12, hard partitions 7*a*, 7*b*, 7*c*, pump 11 (if required) and pockets 8*a*, 8*b*, needn't exceed 300 $cm^3$ at most, and weight needn't exceed 0.3 kg at most, although lower values are possible, especially with the use of microfabrication techniques. This corresponds to the total apparatus weight of less than 0.4 kg, per 0.5 $m^2$ coverage. This in turn corresponds to the ratio $R_{W/A}$, defined as the total apparatus weight relative to area of coverage, of less than 0.8 $kg/m^2$. At absolute most, even for smaller areas of coverage, $R_{W/A}$ needn't exceed 1 $kg/m^2$, such that for instance a glazing unit weighing 10 grams can cover a 100 $cm^2$ square pane. The total sheet thickness being sub-millimetre, and, for most common embodiments not exceeding 0.8 mm, at absolute most the total weight of the sheet material needn't exceed 8 grams per 100 $cm^2$ of coverage (sheet material typically a plastic with density in the region of 1000 $kg/m^3$).

Due to the combination of relatively low a and b, high r, low sheet separation, $T_{min}$ of close to 0% across the 400-1400 nm range becomes possible (meaning that for all intents and purposes light cannot be transmitted through the apparatus when in the 'light-off' mode without encountering an opaque/reflective region). Further, given the high reflectivity of the opaque strip, the same unit is capable of providing privacy in daytime by moving the sheets into another position.

Furthermore, in this embodiment the maximum sheet movement relative to an adjacent sheet is less than 500 microns, with the maximum window facing area of the components directly involved in actuation (which in FIG. 5 corresponds to the maximum area between flange 10*a* and top wall 3*c*, and the maximum area between flange 5*a* and bottom wall 3*a*) of less than 200 $cm^2$. In comparison, a "useful" area where light is being either permanently reflected or variably transmitted (which in FIG. 5 corresponds to the total area between top wall 3*c* and bottom wall 3*a*, including both the transmissive as well as the opaque/reflective regions), is close to 0.5 $m^2$. The parameter $A_U$, which we define as the ratio of the "useful" area to the total window facing area of the apparatus, may therefore be greater than 96% (100% being the maximum possible).

Note that low $T_{min}$ combined with high $A_U$ may be especially important for energy efficient window applications, since the unit can be adjusted to minimise the transmission and maximise the reflection of IR during periods when higher insulation is necessary, whilst being capable of allowing significant IR transmission when IR insulation is no longer required.

Additionally, the co-planarity hindrance factor $H_P$, which we define as the volume of the elements of the glazing unit that, once installed, protrude orthogonally beyond the plane of the unit defined by the window facing sheet (which in FIG. 5 is defined by the plane of window facing wall 1) such that they occupy the space between the plane and the window, is capable of being 0% or close to 0%. In other words, apparatus can be arranged so that no elements of apparatus cross this defining sheet plane.

Also, all components of the apparatus including the sheets are capable of having a high level of ingress protection ($I_p$).

Further note that although the above-described embodiment consisting of 3 optically active sheets has a combined sheet thickness of less than 200 microns, even at greater N, with five or more sheets, in preferred embodiments the total sheet thickness would still not be more than 200 microns. Individual sheet thickness can be of the order of dozens of microns, say 50 μm, although it can be thicker or thinner according to the demands of the application.

Unit Installation

As discussed in previous sections, performance of a light modification unit can be significantly impacted by varying key unit parameters. Although the embodiments herein are not limited to only thin flexible sheets with low feature dimensions, the installation method that will now be described is specifically targeted at thin flexible units, with total sheet thickness not exceeding 0.8 mm, though more typically not exceeding 0.2 mm, and feature dimensions less than 5 cm, though more typically less than 10 mm, or even less than 1 mm. These characteristics, especially the thickness, is of key importance to the installation method. It may be interesting to note that, in comparison, in reference (3) actuation is based on sheets rolled around and taut between support shafts, with thickness not particularly limited as long as the sheets have the flexibility to loop around the support shafts. Yet consider the impact of reducing thickness from, for example, 2 mm to 50 microns on physical and optical characteristics of a pair of light shading sheets, without even considering the impact on P. A pair of 2 mm thick plastic sheets may not be prone to significant creasing/blistering, but with a weight of several $kg/m^2$ (in the region of 4 $kg/m^2$ for acrylic, polycarbonate, and similar materials) it may be unsafe or impractical to mount directly onto a glass pane not manufactured to support such large weights. In comparison, a pair of 50 micron thick sheets may not have similar restrictions, however sheets may be prone to slackness, creasing, etc, such that a tensile stress may be required, for instance by using shafts or weights, as in reference (3). However, significant in-plane stresses distributed across large areas, especially if the distribution is not symmetrical, can lead to sheet deformation such as bowing, creasing, blistering, and other types of defects. Even if such deformations were not to arise immediately at installation, over time the time-dependent strain increase and viscoelastic creep modulus could degrade, especially if the tensile stresses are combined with other factors such as elevated temperature, UV radiation and oxidation. Misalignments of the opaque and transmissive sheet regions could occur, with performance P also impacted. Irrespective of the impact to P though, surface unevenness can be unsightly, making such tensioning methods impractical in many cases. Moreover, physical properties such as load at failure, tearing strength, puncture resistance, reduce with reducing thickness, so other defects could also arise such as impact damage. Similar issues may also occur if sheets are clamped at four sides of a frame, rather than at only two sides.

FIGS. 17*a* and 17*b* represent side cross sections of a set of similarly thin flexible sheets s1, s2, s3 in a stationary mode, subjected to tensile in-plane forces $$F_{\parallel}, F'_{\parallel}, F''_{\parallel}, F'''_{\parallel}$$

as shown, and affected by defects df1 to df5. The forces may vary across the height due to the effects of gravity. Defect df1 in FIG. 17*a* could result from a localised impact onto sheet surface by a sharp object. Defect df2 represents a more generic bowing type deformation, and could be the result of the tensile force, or could be due to other factors such as improper handling, storage, etc. The incoming rays $I_{11}$, $I_<$, I_, although incident at a normal angle, result in transmitted rays $$I'_{11}, I'_{21}, I'_{31}$$

being deflected away from the original direction of travel. Similarly, each of the incoming rays $I_{22}$, $I_{32}$, $I_{42}$, in FIG. 17*b* is impacted by defect df3, df4, df5, respectively, the nature of the defects being such that rays are either reflected back, scattered through into multiple smaller rays, or completely absorbed. Defect df3 could be due to ingress of impurities (e.g. dust), df4 may result from moisture condensation, and df5 could be due to UV/oxygenation of polymer chains, or a variety of other factors. Irrespective of the origin, each defect can reduce optical clarity, and lead to haziness, discolouration, etc. In comparison, the incident rays $I_{41}$ (FIG. 17*a*) and $I_{12}$ (FIG. 17*b*) pass through undeformed sheet regions so are transmitted into rays $$I'_{41} \text{ and } I'_{12},$$

respectively, which retain their original direction of travel.

Now, a key advantage of the unit of this invention is that a number of its characteristics, not least the low $R_{W/A}$, high $A_U$, low $H_P$, low feature dimensions, high r, low $T_{min}$, comparatively high $T_{max}$, high $I_p$, lack of heavy or suspended moving parts, low actuation force, etc, make it suitable for installation directly onto a window pane. More specifically, with reference to FIGS. 18 and 19, with FIG. 18 showing the flexible/slack shape of the light shade apparatus 36, the thin sheets are installed so that they are directly affixed onto the window pane 35 wherein the pane is supporting the bulk of the weight of the apparatus. Moreover, this is done so that in an exemplary system all sheets become taut and can be efficiently translated between different light transmission modes. The sheet closest to the pane substantially abuts the pane 35, and all of the sheets in apparatus 36 become substantially parallel to the pane. The pump 11, if required, may also then be fitted.

FIG. 19 shows a flat window pane 35, however the surface needn't be a window, but could instead be any, flat or curved, transparent or opaque, partition panel with a hard surface. The principles described herein could be extended to non-planar sheets, particularly curved prismatic sheets for particular architectural system, or complex shapes for vehicle windscreens; however, these systems too should be parallel to each other.

Plastic sheets can be affixed onto the window pane by means of electrostatic forces acting between the pane and the abutting sheet. Alternatively, a liquid/gel could be introduced between the pane and an abutting sheet thereby also helping to create an optical connection between them, and at the same time preventing the ingress of dust into the region. Alternatively, use of a heat/pressure lamination process, or of a transparent glue, can help to create a stronger bond such that safety of a glass panel is also improved.

Other methods of installation are also possible, though less preferable. The apparatus can be affixed onto the pane so that at least two opposing sheet sides are fixed/glued onto the pane, wherein the apparatus weight is directly supported by the adjoining pane strip regions. Sheet tension can be created, as demanded by the sheet material, by increasing the distance between two opposing sheet sides. Whilst this can still achieve a high level of ingress protection, it lacks the advantages of optical connection, and as mentioned stresses/strains could be unevenly distributed across the sheet material.

Glazing unit can be installed in situ, or it can be supplied already attached to a glass pane, wherein the system comprising the pane and the glazing unit is then installed in a window.

System Synergies

The system arrangement described in the previous section, comprising a glazing unit consisting of translating sheets affixed onto a pane (typically a window), can result in a number of synergies and advantages. Whilst a pane by itself may not have the capability to regulate light, and a thin glazing unit by itself may be slack and prone to damage, these disadvantages are ameliorated as each member confers their beneficial characteristics onto the other member, resulting in a system with an advantageous set of optical, energy-saving, resiliency, and other characteristics.

For instance, as noted earlier in the document, the apparatus is capable of covering close to 100% of the accessible pane area. In exemplary systems, especially at such a high percentage of coverage, the glazing unit area of coverage can be substantially or completely conferred over into the corresponding system characteristic. Thus, $A_u$ of the glazing unit results in $$A_u^s$$

of the system, $$A_u^s$$

representing the ratio of the pane area where light is being modulated, over the total accessible pane area. As per earlier discussion, given that virtually all accessible pane area can be covered, $$A_u^s$$

exceeding 96% may be possible.

Furthermore, low $T_{min}$ of the unit can similarly result in low $$T_{min}^s$$

of the system, so that $$T_{min}^s$$

of 0% becomes possible (0% meaning no light is transmitted through without encountering an opaque/reflective region). This may be particularly relevant for infrared energy saving applications, as with the usage of a high reflectivity opaque regions (e.g. metallic coating) most infrared light can be reflected. Similarly, a single system can provide light shading/daytime privacy in one position, and 100% light occlusion in another position.

Moreover, the system can be used to reversibly modify transmission/reflection and other properties of already installed windows, since the glazing unit can be retrofitted onto existing as well as onto new windows.

There are no heavy or suspended moving parts that risk causing damage to the window and, as described earlier, in a preferred method of installation the sheet closest to the pane is optically connected to the window pane, thereby minimising reflections at material interfaces, as well as protecting the region from ingress of outside material (ingress protection of the system, $$I_p^s,$$

is high).

Using one of the glazing unit embodiments described herein, comprising 10 or more optically connected sheets, it's thereby possible to modify an existing window so that it transmits more than 90% of normally incident light (maximum light transmission of the system, $$T_{max}^s,$$

is high), with the glazing unit being virtually "invisible" to human eye in the 'light-on' mode, combined with virtually 100% light occlusion in the 'light-off' mode.

Furthermore, the system offers the possibility of incorporating multiple functions into a single device, including: variable light transmission, variable infra-red transmission, improved window safety, improved acoustics (e.g. using polyvinyl butyral). Heat reflection of windows can be adjusted according to user demand, rather than having a constant profile throughout the day and year. Moreover, this is possible without a permanent power source as in a possible embodiment actuation energy can be provided manually.

The glazing unit itself, as mentioned, is generally flexible, can be rolled, is easy to store, and can be retrofitted without requiring more invasive installation methods, such as drilling. The apparatus is easy to remove and once removed doesn't result in any damage to the window.

Another important advantage of the system is sheet conformality and spacing relative to the pane. Generally, more sheet unevenness and spacing leads to worse performance, faster degradation and an uneven window appearance. This is especially the case for units based on thin sheets due to reasons mentioned, even more so when combined with low opaque feature dimensions. Flexural modulus, impact resistance, gravity induced strain, general ability to withstand stresses of various kinds, etc, can all be impacted with reduced conformality.

Two parameters are now introduced as measures of sheet conformality relative to the pane. First, $$\sigma_{Q_n}^s$$

is defined as standard deviation of surface separation at given $Q_n$ in a system comprising N optically active sheets arranged in a broadly parallel orientation relative to a smooth pane, which is flat or has a continuous radius of curvature that is significantly higher compared to the pane width and height:

$$\sigma_{Q_n}^s = \frac{1}{N \cdot b}\sqrt{\sum_{n=1}^{N}\sum_{q=1}^{Q_n}(u_{n,q} - \bar{u}_n)^2 / Q_n} \quad \text{(equation 9)}$$

where the optically active ("useful") area of sheet n, which for the purpose of this discussion is of rectangular shape, is divided into $Q_n$ number of non-overlapping equal area rectangular segments, where $Q_n$ equals $4^{Qi}$ with $Q_i$ being an integer between 0 and 10, and each segment side being $$1/\sqrt{Q_n}$$

in length relative to the length of the corresponding sheet n side that is parallel to it; where $u_{n,q}$ represents the distance from the centre of the (n,q) rectangle to the pane, and $\bar{u}_n$ represents the average of $u_{n,q}$ over all q for given n.

We also define the maximum relative separation $$(d_{Q_n}^s)$$

over all n and q at given $Q_n$:

$$d_{Q_n}^s = \max\left(\frac{|u_{1,1} - \bar{u}_1|}{\bar{u}_1}, \frac{|u_{1,2} - \bar{u}_1|}{\bar{u}_1}, \ldots, \frac{|u_{N,Q_n} - \bar{u}_N|}{\bar{u}_N}\right) \quad \text{(equation 10)}$$

For both of these parameters 0% being the minimum possible corresponds to highest possible conformality. A high amount of bowing, creasing, blistering, generally leads to increases in both parameters, especially at high $Q_n$ compared to low $Q_n$, with bowing increasing $$\sigma_{Q_n}^s$$

especially, and a small local blister more likely to result in an increased $$d_{Q_n}^s.$$

Now, because the system comprises of sheets fixed onto a pane such that sheet movement in direction orthogonal to the pane is substantially or completely limited, whilst sheet movement in direction parallel to the pane between the 'light-on' and 'light-off' positions is allowed, low $$\sigma^s_{Q_\eta} \text{ and } d^s_{Q_\eta}$$

become possible over most or all $Q_n$. Moreover, in comparison to other types of arrangements, such as with sheets clamped at one end, sheet material is subjected to a comparatively low amount of force especially when sheets are not moving, and in addition the forces are more evenly distributed across the material such that tensile and sheer strains tend to be minimised. In addition, the unit weight can be more evenly distributed across the pane instead of being concentrated in a smaller area. In a preferred embodiment comprising individual sheets with thicknesses not exceeding 50 microns, the average separation between the sheet side furthest away from the pane and the pane is less than 0.2 mm, whilst more typically this thickness may be closer to 0.1 mm.

Furthermore, sheets can be translated more reliably with improved tautness and conformality, in addition to the associated improvement of optical clarity. Also, physical properties of the system as a whole, such as load at failure, tearing strength, puncture resistance, general toughness, etc, are significantly greater than that of a glazing unit alone.

FIG. 20 is a longitudinal section of the embodiment of FIG. 18 when installed, showing 3 optically active thin sheets similar to those in FIG. 17*a*, also in a stationary mode. However, in contrast to FIG. 17*a* where in-plane forces $$F_{\|}, F'_{\|}$$

are prominent, the in-plane forces are preferably minimised or even eliminated. Instead, orthogonal forces $F_\perp$ press the sheets against the panel, distributing their weight onto the panel. The sheets are also encased in protective capsule 14. Due to these protective features, unlike in FIG. 17 where sheets are impacted by defects, sheets in FIG. 20 show a high degree of conformality relative to pane 35 (meaning also that the parameters $$\sigma^s_{Q_n} \text{ and } d^s_{Q_n}$$

are small or negligible).

Glazing Unit Comprising Joined Sheets

Although sheets can be assembled into an above-described system from separate sheets and other individual glazing unit components, in preferred embodiments sheets are joined prior to being placed against a window pane. There are obvious advantages to this including improved physical characteristics such as tearing strength of joined sheets compared to that of a single sheet.

In a preferred type of a join, sheet movement in direction orthogonal to sheet plane is completely restricted, whilst at the same time the movement in the direction between the first and the second position is allowed. Sheets are stacked against each other with abutting sheet surfaces; stresses, especially those acting out of plane, but also those acting in plane, can thereby be distributed over all of the sheets in the unit. FIGS. 21*a* to 21*d* now illustrate few of the possible join methods of thin flexible sheets 4*a*, 4*b*, 4*c*.

Figure 21A:
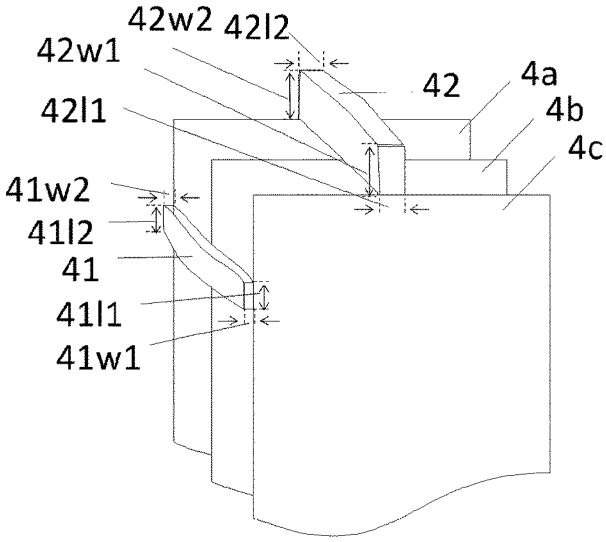

FIG. 21*a* shows two separate and independent join elements, 41 and 42. Edge joining element 41 is placed in the immediate vicinity of an edge of the stacked sheet arrangement, and is physically joined to the two outer-most sheets (4*a*, 4*c*) at the opposing sides of the stacked sheet arrangement. The two outer sheets each have an outer surface, the side facing the page on sheet 4*c* representing the first outer surface, and the sheet side furthest away from the first outer surface on sheet 4*a*, defines a second outer surface. The join elements can be fashioned in a variety of ways, with thicknesses ranging from micrometres to centimetres, and could be composed from a single component or multiple components. Whatever the shape and size however, each join is here taken to have a characteristic "join area" to each of the two outer surfaces. For the purposes of the discussion the two outer surfaces are taken to be flat parallel planes (as indeed would be the case in a typical installation). The first join area is located on the plane of the other side of the first outer sheet (i.e. the side that is not the first outer surface). More specifically, the join area is the cross-section of element 41 and this plane. Items 41*l*1 and 41*w*1 represent the characteristic length and width, respectively, of the first outer surface join area (a first join area). The length 41*l*1 is a line that the first join area projects onto the corresponding edge side (note that in a different example with different edge contours the projection would be onto a curve rather than a line). The width 41*w*1 is a line that is perpendicular to 41*l*1, and that connects two opposing sides of the first join area (in the example shown it would be two opposing sides of a rectangle). If the join area is not a simple shape such as a rectangle, 41*w*1 is then taken to be the longest such line that similarly connects the perimeter of the first join area. The length 41*l*2 and width 41*w*2 are similarly defined in relation to the join area of the second outer sheet; this join area being located on the plane of one of the sides of the second outer sheet (the side that is not the second outer surface).

Element 41 and sheet 4*c* (and/or sheet 4*a*) could be joined from two completely separate components, or could be created from the same cut of a sheet material. Element 41 could comprise a thin sheet of plastic, or it could comprise an extendible type of material such as elastomer or rubber; allowing movement of the two outer sheets relative to each other in direction parallel to sheet surface. Element 41 could also be composed of multiple sub-components (not shown), hard plastic or a suitable alternative, wherein one of the components is connected to the first outer sheet and the other component is connected to the second outer sheet, with the two components abutting each other such that their separation in direction orthogonal to sheet surface is fixed, whilst the two abutting components being able to slide relative to each other in direction between the first and the second position (thus also allowing the two outer sheets to slide relative to each other, whilst keeping their separation in direction orthogonal to sheet surface fixed).

Similar principles also apply to join element 42, and the associated lengths 42*l*1, 42*l*2, and widths 42*w*1, 42*w*2; the difference to element 41 is that the volume of element 42 is greater as it comprises the type of actuation elements shown in FIG. 5, such as the elastic lower support 6 (or upper support 9) and the corresponding flanges shown previously in FIG. 5, which together form an extendible material that joins the two outer surfaces, and that allows sheet movement between the first and the second position.

Although elements 41 and 42 can be used on the same apparatus, as in FIG. 21*a*, they can also be used separately of each other. Further, multiple elements 41 or 42 (dozens, hundreds, or even thousands) could be distributed around the edges. In a preferred embodiment sheet edges can be fully enclosed by the joins, wherein the first set of lengths (41/1, 42/1, etc) form a continuous line around the perimeter of one of the outer sheets, and the second set of lengths (41/2, 42/2, etc) form a continuous line around the perimeter of the second outer sheet (thus forming a capsule such as the one in FIG. 5).

Figure 21B:
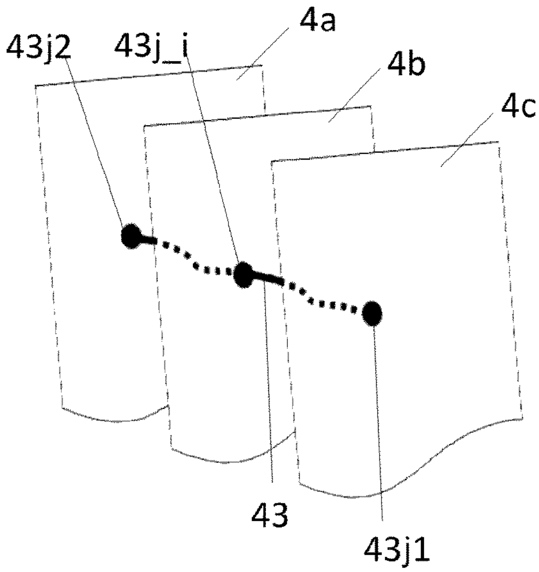

FIG. 21*b* shows an inner type of join, wherein connecting element 43 is located within the boundaries of a sheet area rather than at an edge, and joins the two outer surfaces; elements 43*j*1 and 43*j*2 representing the joins to the first and to the second outer surface, respectively. Along its path element 43 also joins inner sheet 4*b*, wherein this join also has a corresponding join area (43*j_i*). Element 43 could also comprise an extendible type of material such as elastic or rubber, or segments between adjacent sheets can have a slackness that allows the sheets to translate between the first and the second position.

Figure 21C:
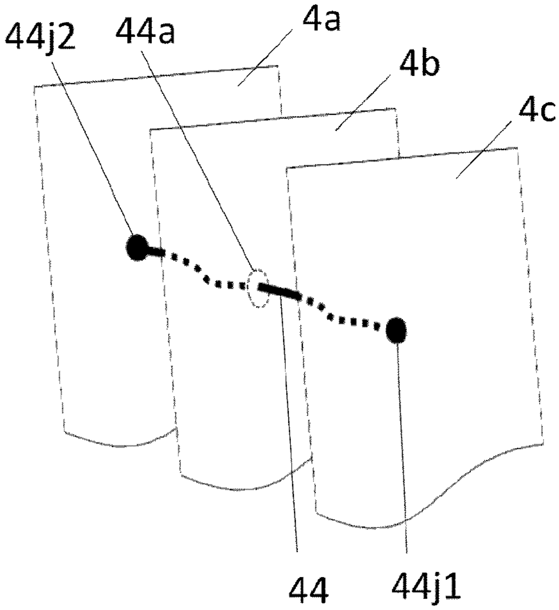

FIG. 21*c* shows another type of an inner join, wherein connecting element 44 is also located within the boundaries of a sheet area rather than at an edge, and also joins the two outer surfaces; 44*j*1 and 44*j*2 representing the join area to the first and to the second outer surface, respectively. Any inner sheet between the two outer sheets, in this case sheet 4*b*, includes an aperture so that element 44 can pass through it without being physically attached to the inner sheet, and furthermore with the aperture dimensions in relation to element 44 such that sheet is able to translate between the first and the second position without obstruction. Element 44 also could be composed of an extendible type of material such as elastic or rubber, or could also have a slackness that allows the two outer sheets to move in relation to each other in direction between the first and the second position.

Figure 21D:
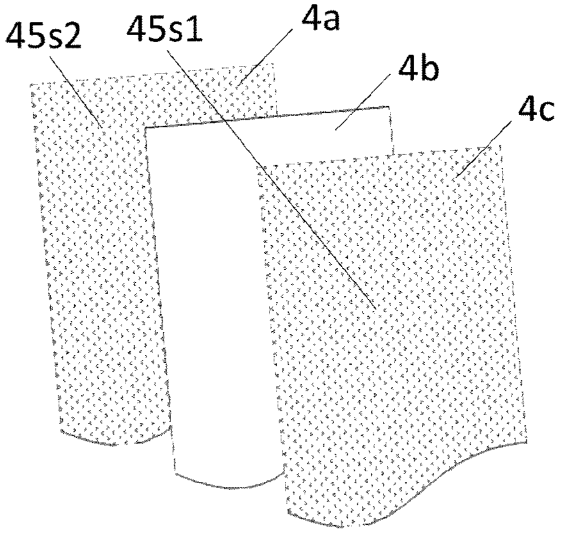

FIG. 21*d* is an illustration of another method of binding, wherein at least two sheets in the unit comprise electrostatically active material, or alternatively, magnetostatically active material (permanent or induced). The materials in the two different sheets attract causing the sheets to stick to each other; any sheets sandwiched between the two attracting sheets thereby also get bound to the stack. Alternatively, all sheets rather than just two sheets could comprise such active material. A number of techniques and materials could be used, such as combining high and low electron affinity materials (polyvinyl chloride (PVC), glass, etc), or introducing charges and/or polarisable dielectric material into or between the sheets. Yet an additional option to note, one of many such possibilities, is to incorporate long-lasting electrets (carnauba wax or a suitable alternative) into the sheet material.

Another binding method (not here shown) is to insert a non-curing transparent binding substance into the space between adjacent sheets, wherein the substance doesn't firm over time, and wherein the moving sheets can move in a first moving direction between at least the first and the second position, wherein the binding substance prevents sheet movement in directions that are orthogonal to the first outer surface, and wherein substantially all areas of all of the sheets become conformal to the first outer surface. The binding substance and the optically connecting material could be one and the same material.

The join methods outlined here could be used in isolation, or in combination with other join methods (e.g. combining elements 41, 42, 43, and/or 44). An apparatus may contain tens, hundreds or thousands of such joins, spread evenly around the sheet are so as to keep conformality constant across different sheet regions. Although the thickness of elements 41, 42, 43, 44 could in some cases be in the centimetre range (e.g. element 42 as described above), more typically thickness would be in the dozens or hundreds of microns. The join elements can thereby cover all sheet area with the total volume of the join material remaining miniscule in comparison to the volume of any single sheet, such that there is no significant impact on the $R_{W/A}$ parameter. Also note that it may be possible to implement another type of a join that resembles element 43 in all aspects except that it's placed in the immediate vicinity of an edge of the stacked sheet arrangement (as is element 41), rather than inside the sheet area. Further, sheets could be stitched together by sewing one or more threads, wherein multiple joins (such as multiple elements 41, 42, 43, or 44) are created from a single thread of material.

These join methods, when deployed in a system comprising a panel and a glazing unit as described, can further help to transfer the glazing unit weight onto the panel. FIG. 20 for purposes of illustration shows a discrete set of joins $J_i$ to $J_{i+4}$ each of which extends from the outer sheet to the panel. The gravitational force of successive vertical glazing unit segments $$\left(G_{\|}^{J_i} \text{ to } G_{\|}^{J_{i+4}}\right),$$

is incrementally transferred over onto the pane, wherein sheet material higher up does not substantially support the weight of the material lower down. This also helps to reduce $$\sigma_{Q_n}^{s} \text{ and } d_{Q_n}^{s}.$$

Whilst only five joins are shown, typically, such as with an abutting electrostatically attached sheet (e.g. similar to cling film on glass), the distribution of weight is substantially continuous over the panel, especially over the vertical panel dimensions. Moreover, although FIG. 20 shows orthogonal force pressing only externally against the outer surface (this being a capability of embodiment earlier described, the air pressure in enclosure 14 being controllable), the orthogonal forces can more typically be created internally by the join elements, such as by electrostatic attraction between the sheets. It's understood of course that the physical join components 41 to 44 can also distribute significant orthogonal force that pull the sheets towards the panel. Furthermore, friction forces between the sheets can be controlled by adjusting the quantity or join element type, or, alternatively, spacers can be inserted in order to reduce the sheet contact area as discussed earlier.

Characteristics of Light Modulating Regions

As previously described, the light modulating feature will typically be an opaque reflective strip having a height of less than 1 mm, however it will be realised that the opaque regions (or regions of different transmissivities) could be arranged in other shapes such as squares or rectangles disposed on each sheet.

Regarding the material of the opaque element, the opaque material (width marked as a in FIG. 13) can be composed of different types of materials, depending on the application type. For devices intended for UV-VIS part of the spectrum the material could be a high reflectivity metallic type of material deposited in thin layers (thickness in the micrometre range, much lower than sheet thickness b) on top of the sheet material so that all wavelengths are blocked. For devices targeting IR and NIR range it could be composed of a material that is transparent to UV-VIS but is reflective to IR and NIR radiation, deposited in thin layers (again, thickness in the micrometre range, much lower than b) on the sheet surface. Note however that for UV-VIS the opaque/reflective material could in principle also extend throughout sheet thickness b, and doesn't necessarily have to be just a thin layer at the top (e.g. it could in principle be imprinted onto polymer sheet by photolithographic exposure). However, for the preferred embodiment of this invention the parameter r is generally greater than 3, and this difference is not as critical to performance. It is also noted again that the modification of the transmissivity of the unit in the UV to IR range has implications for the energy efficiency of a building. Given that a wide range of materials can be used as the reflective layer, include various types of metals, close to maximum possible IR reflectivity may be achievable. Furthermore, the unit can be adjusted to alter or minimise the transmission of IR during periods when higher insulation is necessary, and conversely it can be adjusted to maximise the transmission if the heat within a building is excessive. These are some of the advantages that allow the energy requirements for heating or air conditioning in the building to be reduced.

Further, the embodiments described above feature a first set of regions which are transparent, and a second set of regions which are opaque. However, other light modification effects could be included in the second set of regions, such as reflective, tinted, light scattering regions, polarising regions, or other amplitude, direction modification regions etc. The scattering surface could include prisms to redirect light, etc. Typically, the first set of regions are transparent, but the first set of regions could also feature a light modification effect. The transmissivity of the light modifying regions could be specific to particular wavelength, for example it could filter or attenuate IR or NIR. Also, further sheets could be provided featuring regions having light modifying regions having further characteristics, and several sheet arrangements could be arranged against each other to provide different light modification effects, for example one device could cover 400-700 nm range (visible), and a second device placed in front of the first device covering IR and NIR range (>700 nm). Ideally all devices arranged like this could be optically connected, but could have separate translation means to activate the different sets of sheets.

Ideally, the sheets are translated by the same amount with respect to each adjacent sheet. However, referring to FIGS. 22*a* to 22*c*, sheets could be translated by different amounts to distribute the opaque regions in a different manner.

The embodiments described here assume that sheets are arranged such that, in one position, the opaque regions (or reflective, tinted, light scattering regions, polarising or other transmissivity regions) fully occlude the light in the normal direction, so that complete occlusion occurs. However, embodiments could be provided where the maximum occlusion is not 100%, but some lower amount.

Furthermore, although the embodiments here shown comprise two regions of different transmissivity/reflectivity, other embodiments are possible comprising three or more regions, which could also achieve a similar desired effect without majorly impacting on the key claims in this document. For instance, the second and third region could be light opaque triangles, oriented in opposite direction to each other, each of which reflects a particular colour. Another possibility, wherein the apparatus is a reflective display, is for each sheet to comprise multiple reflective regions (dozen or more) such that in one position the multiple regions across multiple sheets join to form an image, wherein the image disappears and light is transmitted through by translating sheets into another position.

The opaque regions could have a mirrored surface so that a fully transparent window may be changed to a fully reflective or mirrored surface. The regions' transmissivity or reflectivity could also be in the nature of a diffuse reflective surface, even having a colour of parts of an image, as just noted, printed on it. The regions could have different surfaces, colours, patterns or finishes on different sides.

One or more sheets in the present invention can if required be composed of antistatic film or antistatic material can also be inserted between any two sheets of material.

In addition, although the embodiments discussed here are specifically envisaged for use in buildings and similar glazing units, for use a light shade, blind, daylighting device, adjustable privacy film or suchlike, the principles could be equally applied in other optical systems, for example laser experimental bench shutters, camera lenses, vehicle windscreens, eye glasses, large area displays, or by incorporating conductive members in the regions of transmissivity, alterable electromagnetic shields, etc. For circular light modification systems, the opaque regions (or regions having some other transmissivity) could be radially arranged, with the translation of the parallel sheets being rotational.

As described above, each sheet of material in FIG. 5 is considered as smooth and planar, with the incident light at a normal angle to the sheet having the maximum transmission through the sheet. However, the surface of the sheet could be composed of an array of prismatic surfaces (such as in a Fresnel lens) such that the maximum transmission of incident light is at an angle other than normal to the sheet (or where the sheet is curved, normal to the sheet at that point). The angle (and direction) of maximum transmission of incident light could vary over the surface of the sheet, as the small-scale surface of the sheet varies.

Other Actuation Mechanisms

Although a single actuation mechanism is described above and illustrated in FIG. 5, there are other possible actuation mechanisms which could also achieve a similar desired effect without majorly impacting on the key claims in this document. One such mechanism that relies on dielectric elastomer capacitor actuation will now be briefly described.

The apparatus in FIGS. 23*a*, 23*b* comprises mostly of the same elements as described previously for FIG. 5, however actuation is achieved electrically rather than pneumatically, making the partitions 7, pump 11, bellows 16, and materials 6, 9 from FIG. 5 redundant. Actuation elements 21 are introduced, each of which expands by a fixed and equal distance upon supply of one of more voltages by power source 23. Lower flanges 5*a*, 5*b*, 5*c* are replaced with the lower flanges 10*a*', 10*b*', 10*c*'.

FIG. 23 include illustrations of the actuation mechanism, in which conductive and stretchable capacitor plates 22*a*, 22*b*, 22*a*', 22*b*' sandwich elastomer membranes 22*c*, 22*c*'. With no voltage supplied the electric field across the plates is zero and the elastomer material is not subjected to any compressive forces. However, once a voltage is applied the plates attract and move towards each other which compresses the elastomer material causing the membrane to buckle. The buckling in turn leads to an expansion of the actuation element 21, with the actuation pressure being dependent on the amount of applied voltage.

FIG. 23*a* shows the apparatus during the switch to an 'on' state. The actuation elements 21*a*, 21*b*, 21*c* are each supplied with a voltage (electronic circuitry arranged such that, if necessary, voltage can vary from one element to the next), causing each to expand upwards such that the distance between adjacent flanges 10*a*, 10*b*, 10*c* increases equally.

Sheets 4$a$, 4$b$, 4$c$ are thereupon translated to an 'on' position. In embodiments where sheets are stably held by friction, voltage can be removed once the 'on' state has been achieved.

Similarly, the switch to an 'off' state is illustrated in FIG. 23$b$, with voltage now supplied to actuation elements 21$a'$, 21$b'$, 21$c'$ rather than to elements 21$a$, 21$b$, 21$c$. Lower flanges 10$a'$, 10$b'$, 10$c'$ thereby move similarly as in FIG. 23$a$, with the distance between adjacent flanges increasing equally, except that sheets are translated downwards rather than in an upward direction. This results in the sheets 4$a$, 4$b$, 4$c$ translating into an 'off' position. Again, where sheets are stably held by friction, voltage can be removed once the desired state has been achieved.

The combined volume of the newly introduced elements (in comparison to apparatus shown in FIG. 5), which includes the power source 23, actuation elements 21, lower flanges 10$a'$, 10$b'$, 10$c'$, needn't exceed the combined volume of the material that these elements have replaced. So, as in the apparatus in FIG. 5, at absolute most $R_{W/A}$ needn't exceed 1 kg/m$^2$. It's understood of course that with the use of microfabrication techniques, especially with the general trend of shrinking electronic components, each of the new elements can be done on sub-centimetre, or even sub-millimetre scale, so that significantly lower $R_{W/A}$ values are also possible.

Although actuation elements 21 are based on voltage supply to an elastomer dielectric capacitor, it will also be realised that a number of different physical effects, geometries and materials could be deployed to achieve a similar functionality. For instance, rather than deploying the geometry shown in FIG. 23, the space between flanges 10 could be filled with multiple elastomeric capacitors stacked on top of each other, with the flanges physically attached to the ends of each capacitor stack, such that voltage supply across each of the stacks leads to sheet translation. Also, rather than relying on a capacitor, actuation could be achieved by passage of current through a shape memory alloy such as NiTi, or by thermal expansion of a material such as paraffin (also activated by passage of current). As not deemed critical to claims this will not be expanded upon in further detail here.

Glossary

Unless stated otherwise, the meaning of the below terms herein is as follows:

"Standalone" optical characteristics of a region of a sheet in a light modification unit: refers to the region's optical characteristics as measured at room temperature, the region/sheet being isolated from other sheets and unit components, wherein there is no interference due to other sheets/regions/interfaces.

"Transmissivity" of a region of a sheet: refers to the region's "standalone" capacity to transmit electromagnetic radiation over a range of wavelengths and angles of incidence, typically in a range between 400 and 700 nm (visible range), and between 700 and 1400 nm (infra-red), and angles of incidence to surface normal in a range between 0° to 60°, but possibly also at other wavelengths and angles.

"High" vs. "low" "transmissivity" of a region of a sheet: transmissivity of a region of a sheet can differ from transmissivity of another region of the same sheet, over at least a range of wavelengths and/or angles of incidence, due to one or more factors, including for instance due to differences in: refractive index, material/phase composition, surface texture or geometry, polarising region orientation, or other amplitude/direction modification effects. As one such example, if a region composed of a low refractive index material transmits more light compared to another region composed of a high refractive index material, over at least a range of wavelengths and angles, the former and the latter may then be considered as a "high" and a "low" "transmissivity" region, respectively. As another example, a smooth surface region that scatters less light compared to a corrugated surface region such that, over at least a range of wavelengths and angles, the amount of light transmitted through the smooth sheet region is higher compared to the corrugated surface region, then the smooth surface region may correspond to a "high" and the corrugated surface region may correspond to a "low" transmissivity region.

"Reflectivity" of a region of a sheet: refers to the region's "standalone" capacity to reflect electromagnetic radiation, in a range between 400 and 700 nm, and between 700 and 1400 nm, and angles of incidence to surface normal in a range between 0° to 60°, but possibly also at other wavelengths and angles.

"Refractive index": refers to the value at wavelength of 550 nm.

"Sheet": is used herein to refer to a piece of a substance such as glass or plastic (or a mixture of a different materials), that is typically (but not necessarily, and not always) rectangular in form, wherein the substance occupies the space between two surfaces that are parallel or at least substantially parallel to each other, the surface separation being small relative to the width and/or height; depending on the material used, a sheet could have a hard flat surface (e.g. typical window pane), or it could be flexible and curved in shape (e.g. thin PVC sheet). A "sheet" is typically planar or can at least be arranged into a substantially planar form, wherein the dimensions characterising the width and/or height are much greater than thickness. A single piece of a material such as a PVC sheet folded into two or more different areas that are stacked against each other, are for the purposes herein considered to represent multiple sheets rather than just one sheet, because even though they are part of the same parent material, each of the stacked layers performs a distinct role in the context of the unit of the invention.

"Two or more sheets": this could mean two or more different sheets that are not physically connected to each other, or as per the above note, it could also mean that a single parent sheet is folded one or more times, such that different segments of the same parent sheet comprise "two or more sheets", whilst the sheets remain physically joined together.

"Panel": is used herein to refer to a distinct section of a material that is also typically (but not necessarily, and not always) rectangular in form, such as door panel, window panel, etc; importantly however, for the purposes of this document "panel" is considered to have a hard surface; typically, the surface is flat but it could also be curved with a continuous radius of curvature that is significantly higher compared to the width and height.

"Pane": refers to a flat piece of glass, such as that used in a window or door.

"Optically active area" of a unit: refers to the area of the unit where sheets, such as sheets 4$a$, 4$b$, 4$c$ in FIG. 5$a$, move relative to each other whereby light transmitted through the unit, or light reflected by the unit, is modified in some way. In the embodiment shown in FIG. 5*a* this corresponds to the general area between walls 3*a* and 3*c* (being understood of course that FIG. 5*a* represents a longitudinal section rather than the area itself).

"Surface area" of a set of regions: a sheet that comprises transparent and opaque set of regions, such as for instance in FIG. 3 where optically transparent regions 1 and optically opaque regions 2 are shown, each region is bounded by two main sheet surfaces; "surface area" of a set of regions then refers to the area of one of the two sheet sides, rather than to the area of both sheet sides. In case a region is not symmetrical (example not here shown) it corresponds to the area projected onto an outer sheet side (e.g. outer sheet surface facing a window) by light traversing the sheet in direction normal to sheet surface.

"Parallel": sheets are considered to be parallel, or substantially parallel, if the distance between them is the same, or substantially the same, across the optically active sheet area. When referring to sheets as being parallel, it doesn't necessarily mean that sheets are flat. For example, if thin flexible sheets are affixed onto a panel with a curved surface, they are not flat, but as long as they conform to the panel surface such that the distance between two adjacent sheets is substantially the same across the optically active sheet area, then the adjacent sheets are herein considered to be parallel. That is that the spacing between one sheet and the adjacent sheet is constant in a direction perpendicular to any point on the surface of the sheet.

"Primary unit components": components comprising the system here described (a glazing unit consisting of translating sheets affixed onto a pane), may in some cases require a classification into primary and non-primary type of components; because although the glazing unit embodiments as discussed are capable of achieving $R_{W/A}$ of less than 10 grams per 100 $cm^2$ of coverage, other mechanisms, components, or variations could lead to a higher $R_{W/A}$, whilst retaining the essence of the system. For instance, the actuation mechanism could comprise a heavy electromagnetic motor, battery, pump, other electronic components, or another component could be significantly heavier relative to their equivalent (performing the same or similar function) in this document. In some cases, such heavy components may even add capability to the apparatus, such as a heavier pump resulting in a quicker transitioning time between different light transmission modes, or a heavier battery resulting in longer times between battery charges. However, for the purposes of this document, including the claims section, any such battery, pump, electrostatic or other motor, or any other such-like component or a combination of components, especially if they are inherently/directly a part of the actuation mechanism rather than an indispensable part of the sheets, that for areas of sheet coverage greater than 100 $cm^2$ weigh more than the combined weight of the sheets of the apparatus, are classified as being non-primary (i.e. not belonging to "primary unit components"). This is especially the case if, in the context of the system here, the component or components can be substituted by less heavy substitutes whilst the essence of the core function remains the same. Moreover, possibly one or more of such heavier components (once again, this could be a motor, pump, battery, etc) could even be affixed onto a window pane, or due to their weight could rest on a sill wherein the pane doesn't support their weight, but with a physical connection to the glazing unit that enables the transfer of actuation energy onto the glazing unit. Here, also, any such component that can be physically separated from the main body of the apparatus, especially if its weight is not directly supported by the window pane, is not considered to be a "primary unit component".

REFERENCES

1. U.S. Pat. No. 3,444,919
2. U.S. Pat. No. 8,959,835
3. WO2012/105007 A1 (NAM CORP)
4. US Publication No. 2009/0296188
5. Born, M. and Wolf, E.; "Principles of Optics: Electromagnetic Theory of Propagation, Interference and Diffraction of Light"; $6^{th}$ ed.; ch. 1,2, 7; Pergamon Press (1980)
6. Zhu, S., A. W. Yu, D. Hawley, and R. Roy; "Frustrated total internal reflection: A demonstration and review"; American Journal of Physics. 54 (7), 601-606 (1986)
7. U.S. Pat. No. 3,514,183
8. U.S. Pat. Nos. 6,022,606, 4,182,734; also, see www.engineeringtoolbox.com.
9. Hardy, A. C. and Perrin, F. H.; "The Principles of Optics"; $1^{st}$ ed.; p. 585; McGraw-Hill: New York and London (1932)
10. Hecht Eugene; Optics, $2^{nd}$ ed.; ch. 4, 9; Addison Wesley: New York (1987)
11. S. A. Carvalho, S. De Leo; "Light Transmission Through a Triangular Air Gap"; Journal of Modern Optics 60, 437-443 (2013)
12. N. Sultanova, S. Kasarova and I. Nikolov; "Dispersion properties of optical polymers"; Acta Physica Polonica A116, 585-587 (2009)

The invention claimed is:

1. A light modification unit comprising:

two or more sheets, including a first sheet comprising a first high transmissivity set of regions, and at least one additional set of regions comprising a first low transmissivity set of regions, wherein over at least a range of wavelengths between 350-1400 nm including at a first wavelength the transmissivity of the first high transmissivity set of regions is higher than the transmissivity of the first low transmissivity set of regions, and a second sheet comprising a second high transmissivity set of regions, and at least one additional set of regions comprising a second low transmissivity set of regions, wherein at least at the first wavelength the transmissivity of the second high transmissivity set of regions is higher than the transmissivity of the second low transmissivity set of regions, the second sheet positioned substantially parallel to the first sheet, an actuation mechanism capable of translating at least the second sheet relative to the first sheet, between at least a first position, in which the first high transmissivity set of regions are substantially aligned with the second high transmissivity set of regions such that there is a substantial overlap between them, and a second position, in which the alignment between the first high transmissivity set of regions and the second high transmissivity set of regions is reduced such that the overlap between the first and the second high transmissivity sets of regions is reduced compared to the first position, wherein at least in the first position at least one portion of the surface of the second sheet is separated from the surface of the first sheet by an arithmetic average distance of less than 400 nm, such that an optical connection is achieved between at least portions of the first and the second sheet in at least the first position, irrespective of the type of medium that fills the space between the first and the second sheet.

2. The light modification unit according to claim 1, wherein an optical coupling material fills at least some of the space between at least one portion of the first and the second sheet, such that in at least the first position an optical connection is achieved between at least portions of the first and the second sheet.

3. The light modification unit according to claim 2, wherein an optical coupling material fills substantially all space between at least the first and the second sheet, such that in at least the first position an optical connection is achieved between at least the first and the second sheet.

4. The light modification unit according to claim 2, wherein the optical coupling material is an optical coupling liquid, optical coupling colloid, elastomer, rubber, viscoelastic material, soft malleable transparent putty, or other such-like material.

5. The light modification unit according to claim 2, wherein the refractive index difference between the high transmissivity sheet material and the optically connecting material is less than 0.1 over 480-630 nm range, at least at room temperature.

6. The light modification unit according to claim 1, wherein in at least the first position the surface of at least the second high transmissivity set of regions is separated from the surface of the first sheet by an arithmetic average distance of more than 250 nm and less than 310 nm.

7. The light modification unit according to claim 1, wherein the transmissivity of the first high transmissivity set of regions is higher than the transmissivity of the first low transmissivity set of regions at a normal angle of incidence, and the transmissivity of the second high transmissivity set of regions is higher than the transmissivity of the second low transmissivity set of regions at a normal angle of incidence.

8. A light modification unit comprising:

two or more sheets, including a first sheet comprising a first high transmissivity set of regions, and at least one additional set of regions comprising a first low transmissivity set of regions, wherein over at least a range of wavelengths between 350-1400 nm including at a first wavelength the transmissivity of the first high transmissivity set of regions is higher than the transmissivity of the first low transmissivity set of regions, and a second sheet comprising a second high transmissivity set of regions, and at least one additional set of regions comprising a second low transmissivity set of regions, wherein at least at the first wavelength the transmissivity of the second high transmissivity set of regions is higher than the transmissivity of the second low transmissivity set of regions, the second sheet positioned substantially parallel to the first sheet, an actuation mechanism capable of translating at least the second sheet relative to the first sheet, between at least a first position, in which the first high transmissivity set of regions are substantially aligned with the second high transmissivity set of regions such that there is a substantial overlap between them, and a second position, in which the alignment between the first high transmissivity set of regions and the second high transmissivity set of regions is reduced such that the overlap between the first and the second high transmissivity sets of regions is reduced compared to the first position, wherein an optical coupling material fills at least some of the space between at least one portion of the first and the second sheet, or at least in the first position at least one portion of the surface of the second sheet is separated from the surface of the first sheet by an arithmetic average distance of less than 400 nm, such that an optical connection is achieved between at least portions of the first and the second sheet in at least the first position, wherein each sheet comprises two sets of regions, wherein at least the first and the second high transmissivity sets of regions are substantially transparent to light in the 400-700 nm range, wherein at least the first and the second low transmissivity sets of regions are substantially opaque to light in the 400-700 nm range, the reflectivity of the first and the second low transmissivity sets of regions generally being non-zero in the range between 400 and 700 nm, and wherein in the first position the overlap between the first high transmissivity set of regions and the second high transmissivity set of regions is substantially complete, wherein the overlap between the first low transmissivity set of regions and the second low transmissivity set of regions is substantially complete, and wherein in the second position at least the second low transmissivity set of regions significantly overlap the first high transmissivity set of regions, and at least the first low transmissivity set of regions significantly overlap the second high transmissivity set of regions, wherein each region of the first and the second high transmissivity sets of regions is substantially or completely overlapped by an opaque region.

9. The light modification unit according to claim 8, wherein at least one dimension of each of the opaque regions in each of the opaque sets of regions is less than 10 mm, and wherein the amount of light transmitted through the unit is controlled by adjusting the amount of translation of at least the second sheet between the first and the second position.

10. The light modification unit according to claim 9, wherein the sum of average sheet thickness over all of the sheets in the unit does not exceed 1 mm, wherein in the first position the unit is capable of transmitting more than 40% of light in the 400-700 nm range at least at normal angle of incidence, wherein in the second position the unit is capable of occluding all light in the 400-700 nm range at least at normal angle of incidence, and wherein the unit is capable of being placed against a window pane.

11. The light modification unit according to claim 10, wherein the opaque sets of regions are reflective in the 400-700 nm range, wherein the unit is capable of providing adjustable daytime privacy.

12. The light modification unit according to claim 9, consisting of more than 4 sheets, wherein the sum of average sheet thickness over all of the sheets in the unit does not exceed 1 mm, wherein at least one dimension of each of the opaque regions in each of the opaque sets of regions is less than 1 mm.

13. The light modification unit according to claim 12, wherein there are more than 10 sheets, and wherein the unit is capable of transmitting more than 90% of light in the 400-700 nm range at least at normal angle of incidence.

14. The light modification unit according to claim 12, adapted to reflect radiative heat energy, wherein the first and the second low transmissivity sets of regions are reflective in the 700-1400 nm range.

15. The light modification unit according to claim 12, adapted to reflect one or more images, wherein in the first position the unit is substantially transparent to light in the 400-700 nm range, and wherein in at least the second position the opaque sets of regions are aligned so as to form an image, whereby the unit is capable of being used in advertising displays.

16. The light modification unit according to claim 12, adapted to mirror an image, wherein the opaque sets of regions are reflective in the 400-700 nm range, wherein in the first position the unit is substantially transparent in the 400-700 nm range, and wherein in the second position the opaque sets of regions are aligned such that the unit is capable of being used as a mirror.

17. A light modification unit comprising two light modification units according to claim 12, the transmissivity and/or reflectivity of the first and the second low transmissivity sets of regions of the first light modification unit being different to the transmissivity and/or reflectivity of the first and the second low transmissivity sets of regions of the second light modification unit.

* * * * *